United States Patent
Shin et al.

(10) Patent No.: US 11,215,832 B2
(45) Date of Patent: Jan. 4, 2022

(54) ELECTRONIC DEVICE

(71) Applicant: LG ELECTRONICS INC., Seoul (KR)

(72) Inventors: Seungyong Shin, Seoul (KR); Hyunchul Kim, Seoul (KR); Sungchul Shin, Seoul (KR); Taekyoung Oh, Seoul (KR); Changkyu Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 280 days.

(21) Appl. No.: 16/495,380

(22) PCT Filed: Aug. 27, 2019

(86) PCT No.: PCT/KR2019/010951
§ 371 (c)(1),
(2) Date: Sep. 18, 2019

(87) PCT Pub. No.: WO2021/040076
PCT Pub. Date: Mar. 4, 2021

(65) Prior Publication Data
US 2021/0333550 A1    Oct. 28, 2021

(51) Int. Cl.
*G02B 27/01* (2006.01)
*G02C 9/02* (2006.01)

(52) U.S. Cl.
CPC ..... *G02B 27/0172* (2013.01); *G02B 27/0176* (2013.01); *G02C 9/02* (2013.01);
(Continued)

(58) Field of Classification Search
CPC .. G02B 27/0172; G02B 27/017; G02B 27/01; G02B 27/0176; G02B 2027/0154; G02B 2027/0178; G02C 9/02; G02C 9/00
(Continued)

(56) References Cited

U.S. PATENT DOCUMENTS 5,506,730 A * 4/1996 Morley ............... G02B 23/125
                                                          359/815
9,535,253 B2 * 1/2017 Levola .................... G02F 1/011
(Continued)

FOREIGN PATENT DOCUMENTS

KR    1020160075571    6/2016
KR    1020170090419    8/2017
(Continued)

OTHER PUBLICATIONS

PCT International Application No. PCT/KR2019/010951, International Search Report dated May 26, 2020, 3 pages.

*Primary Examiner* — William R Alexander
(74) *Attorney, Agent, or Firm* — Lee, Hong, Degerman, Kang & Waimey PC

(57) ABSTRACT

Disclosed is an electronic device. An electronic device according to the present invention includes: a main frame having a first opening; a display unit connected to the main frame and having a display area which may be exposed through the first opening; and a virtual reality frame movably coupled to the main frame and having a second opening to which a first lens is coupled, in which when the virtual reality frame moves to a first location where the first opening and the second opening are arranged side by side in a sight direction of a user, the user is capable of recognizing an image of the display unit as a virtual reality image through the first lens, and when the virtual reality frame moves to a second location deviated from the first location, the user is capable of recognizing the image of the display unit as an augmented reality image. An electronic device according to the present invention may be associated with an artificial intelligence module, robot, augmented reality (AR) device, virtual reality (VR) device, and device related to 5G services.

19 Claims, 16 Drawing Sheets

(52) U.S. Cl.
CPC ............... *G02B 2027/0154* (2013.01); *G02B 2027/0178* (2013.01)

(58) Field of Classification Search
USPC .......................................................... 359/632
See application file for complete search history.

(56) References Cited

U.S. PATENT DOCUMENTS

| | | | |
|---|---|---|---|
| 9,606,612 B2* | 3/2017 | Milford | H04M 1/72454 |
| 9,678,349 B2* | 6/2017 | Yang | G02B 27/0176 |
| 10,067,359 B1* | 9/2018 | Ushakov | G02B 27/0176 |
| 10,386,887 B2* | 8/2019 | Chen | G02B 27/00 |
| 10,802,290 B2* | 10/2020 | Lin | G02B 27/0176 |
| 2011/0127305 A1* | 6/2011 | Yates | G02B 7/002 |
| | | | 224/181 |
| 2012/0002046 A1* | 1/2012 | Rapoport | A42B 3/04 |
| | | | 348/143 |
| 2012/0056847 A1* | 3/2012 | Milford | H04W 52/0251 |
| | | | 345/174 |
| 2018/0284454 A1* | 10/2018 | Reed | G06K 9/00671 |
| 2019/0138049 A1* | 5/2019 | Serota | G06F 1/163 |
| 2019/0212567 A1* | 7/2019 | Lin | G02B 27/0172 |
| 2020/0050235 A1* | 2/2020 | Yoon | G06F 1/163 |
| 2020/0285074 A1* | 9/2020 | Zimanyi | G02B 27/0093 |

FOREIGN PATENT DOCUMENTS

| | | |
|---|---|---|
| KR | 101868405 | 6/2018 |
| KR | 1020180126174 | 11/2018 |
| KR | 1020190039589 | 4/2019 |

* cited by examiner

ELECTRONIC DEVICE

CROSS-REFERENCE TO RELATED APPLICATIONS

This application is the National Stage filing under 35 U.S.C. 371 of International Application No. PCT/KR2019/010951, filed on Aug. 27, 2019, the contents of which are hereby incorporated by reference herein in its entirety.

TECHNICAL FIELD

The present invention relates to an electronic device and, more particularly, to an electronic device used for Virtual Reality (VR), Augmented Reality (AR), and Mixed Reality (MR).

BACKGROUND ART

Virtual reality (VR) refers to a special environment or situation generated by man-made technology using computer and other devices, which is similar but not exactly equal to the real world.

Augmented reality (AR) refers to the technology that makes a virtual object or information interwoven with the real world, making the virtual object or information perceived as if exists in reality.

Mixed reality (MR) or hybrid reality refers to combining of the real world with virtual objects or information, generating a new environment or new information. In particular, mixed reality refers to the experience that physical and virtual objects interact with each other in real time.

The virtual environment or situation in a sense of mixed reality stimulates the five senses of a user, allows the user to have a spatio-temporal experience similar to the one perceived from the real world, and thereby allows the user to freely cross the boundary between reality and imagination. Also, the user may not only get immersed in such an environment but also interact with objects implemented in the environment by manipulating or giving a command to the objects through an actual device.

Recently, research into the gear specialized in the technical field above is being actively conducted.

However, since as electronic devices in the related art, an electronic device providing the virtual reality and an electronic device providing the augmented reality exist separately, a user has to purchase separate electronic devices in order to experience both the virtual reality and the augmented reality, and as a result, an economic burden works and when the user intends to experience the augmented reality (or virtual reality) while experiencing the virtual reality (or augmented reality), there is a hassle to replace the electronic device.

DISCLOSURE

Technical Problem

An embodiment of the present invention provides an electronic device capable of selectively providing a virtual reality and an augmented reality in using an electronic device used in virtual reality (VR), augmented reality (AR), mixed reality (MR), etc.

Technical Solution

According to an aspect of the present invention, there may be provided an electronic device including: a main frame having a first opening; a display unit connected to the main frame and having a display area which may be exposed through the first opening; and a virtual reality frame movably coupled to the main frame and having a second opening to which a first lens is coupled, in which when the virtual reality frame moves to a first location where the first opening and the second opening are arranged side by side in a sight direction of a user, the user is capable of recognizing an image of the display unit as a virtual reality image through the first lens, and when the virtual reality frame moves to a second location deviated from the first location, the user is capable of recognizing the image of the display unit as an augmented reality image.

Here, the virtual reality frame is rotatably coupled to the main frame to move between the first location and the second location.

More specifically, the main frame may include a first stop member and the virtual reality frame may rotate downward and move to the first location and may be supported on the first stop member at the first location and may rotate upward and move to the second location.

Further, the display unit may include a second lens for converting the image into an augmented reality image.

Further, the display unit may be movable to a third location where the display area is disposed inside the first opening and a fourth location in which the display area is far from the first opening.

In addition, the electronic device may further include a reflection member reflecting the image of the display unit at the fourth location and transferring the reflected image to eyes of the user through the first opening.

More specifically, the main frame may include a second stop member, and the reflection member is rotatably coupled to the display unit, and rotates and moves to be supported on the second stop member.

In addition, one side of the display unit may be rotatably coupled to the main frame and the other side may be rotatably coupled to one side of the reflection member, and the other side of the reflection member may be supportable on the second stop member.

Here, while the reflection member is supported on the second stop member, the display unit and the reflection member may form an angle of 45 degrees and the reflection member and the first opening may form the angle of 45 degrees.

Further, the reflection member may be provided to reflect the image of the display unit and transmit external light.

Further, in another aspect, the display unit may be provided to transmit the external light, and the user may be capable of simultaneously recognizing the image of the display unit and an environment reflected through the display unit, through the first opening.

In addition, the electronic device may further include a blocking member provided at one side of the display unit and made of a translucent or opaque material, in which the blocking member may be provided to move between a location to open an area corresponding to the display area of the display unit and a location to block the area.

Here, the blocking member may be provided to slidably move at one side of the display unit.

According to another aspect of the present invention, there may be provided an electronic device including: a main frame having a first opening; a virtual reality frame movably coupled to the main frame between a first location and a second location and having a second opening to which a first lens is coupled; and an augmented reality frame movably coupled to the main frame between a third location and a fourth location and including a display unit, in which when the virtual reality frame is positioned at the first location and the augmented reality frame is positioned at the third location, a user is capable of recognizing the image of the display unit as a virtual reality image through the second opening and the first opening, and when the virtual reality frame is positioned at the second location and the augmented reality frame is positioned at the fourth location, the user is capable of recognizing an augmented reality image in which the image of the display unit is mixed with a reality image viewed through the first opening.

Here, in the augmented reality image, at the third location, a display area of the display unit is disposed adjacent to the first opening to be directly exposed through the first opening, and at the fourth location, the display area of the display unit is disposed away from the first opening and the image of the display unit is reflected by a reflection member and transferred to eyes of the user through the first opening.

In addition, the electronic device may further include a reflection member reflecting the image of the display unit and transferring the reflected image to eyes of the user through the first opening.

In this case, in the augmented reality image, at the third location, a display area of the display unit is disposed adjacent to the first opening to be directly exposed through the first opening, and at the fourth location, the display area of the display unit is disposed away from the first opening and the image of the display unit is reflected by a reflection member and transferred to eyes of the user through the first opening.

Further, the virtual reality frame may be rotatably coupled to the main frame, one side of the augmented reality frame may be rotatably coupled to the main frame, and the reflection member is rotatably coupled to the other side of the augmented reality frame.

More specifically, at the fourth location, the augmented reality frame may be away from the main frame at a predetermined angle and the reflection member may be away from the augmented reality frame at a predetermined angle and may be supported and fixed onto the main frame.

According to yet another aspect of the present invention, there may be provided an electronic device including: a main frame having a first opening; a virtual reality frame movably coupled to one side of the main frame; and an augmented reality frame movably coupled to the other side of the main frame, in which when the virtual reality frame and the augmented reality frame are positioned at a first location, a virtual reality image is provided to a user, and when the virtual reality frame and the augmented reality frame are positioned at a second location, an augmented reality image is provided to the user.

Advantageous Effects

According to the present invention, an electronic device can selectively provide a virtual reality and an augmented reality as one device. Therefore, there is an economical advantage in that it is possible to purchase a single product that provides both the virtual reality and the augmented reality at lower cost than purchasing each product from the viewpoint of a user.

In addition, when the user intends to experience the augmented reality (or virtual reality) while experiencing the virtual reality (or augmented reality), desired contents can be provided by changing an operation mode of a worn device without a hassle to replace the electronic device which is worn.

Further, according to at least one of embodiments of the present invention, a mode can be changed without a hassle to attach and detach a separate unit in order to experience different modes (virtual reality mode and augmented reality mode).

MODE FOR INVENTION

Figure 1:
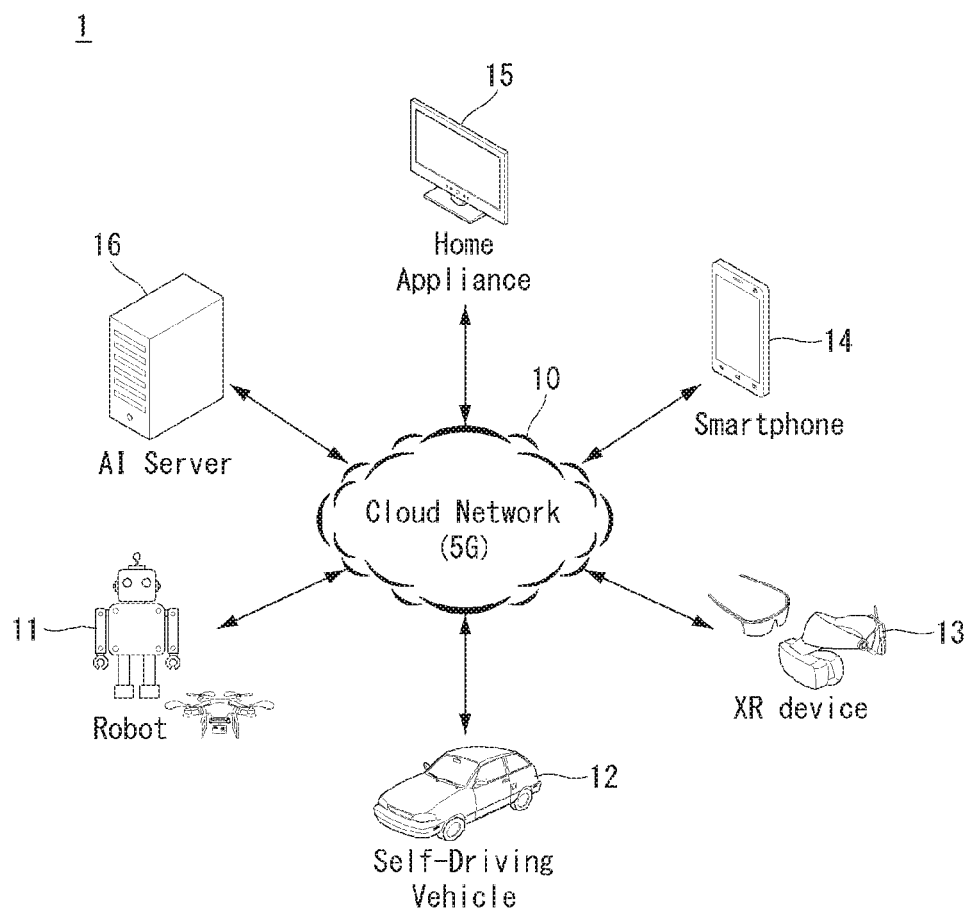
FIG. 1 illustrates one embodiment of an AI device.

In what follows, embodiments disclosed in this document will be described in detail with reference to appended drawings, where the same or similar constituent elements are given the same reference number irrespective of their drawing symbols, and repeated descriptions thereof will be omitted.

In describing an embodiment disclosed in the present specification, if a constituting element is said to be "connected" or "attached" to other constituting element, it should be understood that the former may be connected or attached directly to the other constituting element, but there may be a case in which another constituting element is present between the two constituting elements.

Also, in describing an embodiment disclosed in the present document, if it is determined that a detailed description of a related art incorporated herein unnecessarily obscure the gist of the embodiment, the detailed description thereof will be omitted. Also, it should be understood that the appended drawings are intended only to help understand embodiments disclosed in the present document and do not limit the technical principles and scope of the present invention; rather, it should be understood that the appended drawings include all of the modifications, equivalents or substitutes described by the technical principles and belonging to the technical scope of the present invention.

[5G Scenario]

The three main requirement areas in the 5G system are (1) enhanced Mobile Broadband (eMBB) area, (2) massive Machine Type Communication (mMTC) area, and (3) Ultra-Reliable and Low Latency Communication (URLLC) area.

Some use case may require a plurality of areas for optimization, but other use case may focus only one Key Performance Indicator (KPI). The 5G system supports various use cases in a flexible and reliable manner.

eMBB far surpasses the basic mobile Internet access, supports various interactive works, and covers media and entertainment applications in the cloud computing or augmented reality environment. Data is one of core driving elements of the 5G system, which is so abundant that for the first time, the voice-only service may be disappeared. In the 5G, voice is expected to be handled simply by an application program using a data connection provided by the communication system. Primary causes of increased volume of traffic are increase of content size and increase of the number of applications requiring a high data transfer rate. Streaming service (audio and video), interactive video, and mobile Internet connection will be more heavily used as more and more devices are connected to the Internet. These application programs require always-on connectivity to push real-time information and notifications to the user. Cloud-based storage and applications are growing rapidly in the mobile communication platforms, which may be applied to both of business and entertainment uses. And the cloud-based storage is a special use case that drives growth of uplink data transfer rate. The 5G is also used for cloud-based remote works and requires a much shorter end-to-end latency to ensure excellent user experience when a tactile interface is used. Entertainment, for example, cloud-based game and video streaming, is another core element that strengthens the requirement for mobile broadband capability. Entertainment is essential for smartphones and tablets in any place including a high mobility environment such as a train, car, and plane. Another use case is augmented reality for entertainment and information search. Here, augmented reality requires very low latency and instantaneous data transfer.

Also, one of highly expected 5G use cases is the function that connects embedded sensors seamlessly in every possible area, namely the use case based on mMTC. Up to 2020, the number of potential IoT devices is expected to reach 20.4 billion. Industrial IoT is one of key areas where the 5G performs a primary role to maintain infrastructure for smart city, asset tracking, smart utility, agriculture and security.

URLLC includes new services which may transform industry through ultra-reliable/ultra-low latency links, such as remote control of major infrastructure and self-driving cars. The level of reliability and latency are essential for smart grid control, industry automation, robotics, and drone control and coordination.

Next, a plurality of use cases will be described in more detail.

The 5G may complement Fiber-To-The-Home (FTTH) and cable-based broadband (or DOCSIS) as a means to provide a stream estimated to occupy hundreds of megabits per second up to gigabits per second. This fast speed is required not only for virtual reality and augmented reality but also for transferring video with a resolution more than 4K (6K, 8K or more). VR and AR applications almost always include immersive sports games. Specific application programs may require a special network configuration. For example, in the case of VR game, to minimize latency, game service providers may have to integrate a core server with the edge network service of the network operator.

Automobiles are expected to be a new important driving force for the 5G system together with various use cases of mobile communication for vehicles. For example, entertainment for passengers requires high capacity and high mobile broadband at the same time. This is so because users continue to expect a high-quality connection irrespective of their location and moving speed. Another use case in the automotive field is an augmented reality dashboard. The augmented reality dashboard overlays information, which is a perception result of an object in the dark and contains distance to the object and object motion, on what is seen through the front window. In a future, a wireless module enables communication among vehicles, information exchange between a vehicle and supporting infrastructure, and information exchange among a vehicle and other connected devices (for example, devices carried by a pedestrian). A safety system guides alternative courses of driving so that a driver may drive his or her vehicle more safely and to reduce the risk of accident. The next step will be a remotely driven or self-driven vehicle. This step requires highly reliable and highly fast communication between different self-driving vehicles and between a self-driving vehicle and infrastructure. In the future, it is expected that a self-driving vehicle takes care of all of the driving activities while a human driver focuses on dealing with an abnormal driving situation that the self-driving vehicle is unable to recognize. Technical requirements of a self-driving vehicle demand ultra-low latency and ultra-fast reliability up to the level that traffic safety may not be reached by human drivers.

The smart city and smart home, which are regarded as essential to realize a smart society, will be embedded into a high-density wireless sensor network. Distributed networks comprising intelligent sensors may identify conditions for cost-efficient and energy-efficient conditions for maintaining cities and homes. A similar configuration may be applied for each home. Temperature sensors, window and heating controllers, anti-theft alarm devices, and home appliances will be all connected wirelessly. Many of these sensors typified with a low data transfer rate, low power, and low cost. However, for example, real-time HD video may require specific types of devices for the purpose of surveillance.

As consumption and distribution of energy including heat or gas is being highly distributed, automated control of a distributed sensor network is required. A smart grid collects information and interconnect sensors by using digital information and communication technologies so that the distributed sensor network operates according to the collected information. Since the information may include behaviors of energy suppliers and consumers, the smart grid may help improving distribution of fuels such as electricity in terms of efficiency, reliability, economics, production sustainability, and automation. The smart grid may be regarded as a different type of sensor network with a low latency.

The health-care sector has many application programs that may benefit from mobile communication. A communication system may support telemedicine providing a clinical care from a distance. Telemedicine may help reduce barriers to distance and improve access to medical services that are not readily available in remote rural areas. It may also be used to save lives in critical medical and emergency situations. A wireless sensor network based on mobile communication may provide remote monitoring and sensors for parameters such as the heart rate and blood pressure.

Wireless and mobile communication are becoming increasingly important for industrial applications. Cable wiring requires high installation and maintenance costs. Therefore, replacement of cables with reconfigurable wireless links is an attractive opportunity for many industrial applications. However, to exploit the opportunity, the wireless connection is required to function with a latency similar to that in the cable connection, to be reliable and of large capacity, and to be managed in a simple manner. Low latency and very low error probability are new requirements that lead to the introduction of the 5G system.

Logistics and freight tracking are important use cases of mobile communication, which require tracking of an inventory and packages from any place by using location-based information system. The use of logistics and freight tracking typically requires a low data rate but requires large-scale and reliable location information.

The present invention to be described below may be implemented by combining or modifying the respective embodiments to satisfy the aforementioned requirements of the 5G system.

FIG. 1 illustrates one embodiment of an AI device.

Referring to FIG. 1, in the AI system, at least one or more of an AI server 16, robot 11, self-driving vehicle 12, XR device 13, smartphone 14, or home appliance 15 are connected to a cloud network 10. Here, the robot 11, self-driving vehicle 12, XR device 13, smartphone 14, or home appliance 15 to which the AI technology has been applied may be referred to as an AI device (11 to 15).

The cloud network 10 may comprise part of the cloud computing infrastructure or refer to a network existing in the cloud computing infrastructure. Here, the cloud network 10 may be constructed by using the 3G network, 4G or Long Term Evolution (LTE) network, or 5G network.

In other words, individual devices (11 to 16) constituting the AI system may be connected to each other through the cloud network 10. In particular, each individual device (11 to 16) may communicate with each other through the eNB but may communicate directly to each other without relying on the eNB.

The AI server 16 may include a server performing AI processing and a server performing computations on big data.

The AI server 16 may be connected to at least one or more of the robot 11, self-driving vehicle 12, XR device 13, smartphone 14, or home appliance 15, which are AI devices constituting the AI system, through the cloud network 10 and may help at least part of AI processing conducted in the connected AI devices (11 to 15).

At this time, the AI server 16 may teach the artificial neural network according to a machine learning algorithm on behalf of the AI device (11 to 15), directly store the learning model, or transmit the learning model to the AI device (11 to 15).

At this time, the AI server 16 may receive input data from the AI device (11 to 15), infer a result value from the received input data by using the learning model, generate a response or control command based on the inferred result value, and transmit the generated response or control command to the AI device (11 to 15).

Similarly, the AI device (11 to 15) may infer a result value from the input data by employing the learning model directly and generate a response or control command based on the inferred result value.

<AI+Robot>

By employing the AI technology, the robot 11 may be implemented as a guide robot, transport robot, cleaning robot, wearable robot, entertainment robot, pet robot, or unmanned flying robot.

The robot 11 may include a robot control module for controlling its motion, where the robot control module may correspond to a software module or a chip which implements the software module in the form of a hardware device.

The robot 11 may obtain status information of the robot 11, detect (recognize) the surroundings and objects, generate map data, determine a travel path and navigation plan, determine a response to user interaction, or determine motion by using sensor information obtained from various types of sensors.

Here, the robot 11 may use sensor information obtained from at least one or more sensors among lidar, radar, and camera to determine a travel path and navigation plan.

The robot 11 may perform the operations above by using a learning model built on at least one or more artificial neural networks. For example, the robot 11 may recognize the surroundings and objects by using the learning model and determine its motion by using the recognized surroundings or object information. Here, the learning model may be the one trained by the robot 11 itself or trained by an external device such as the AI server 16.

At this time, the robot 11 may perform the operation by generating a result by employing the learning model directly but also perform the operation by transmitting sensor information to an external device such as the AI server 16 and receiving a result generated accordingly.

The robot 11 may determine a travel path and navigation plan by using at least one or more of object information detected from the map data and sensor information or object information obtained from an external device and navigate according to the determined travel path and navigation plan by controlling its locomotion platform.

Map data may include object identification information about various objects disposed in the space in which the robot 11 navigates. For example, the map data may include object identification information about static objects such as wall and doors and movable objects such as a flowerpot and a desk. And the object identification information may include the name, type, distance, location, and so on.

Also, the robot 11 may perform the operation or navigate the space by controlling its locomotion platform based on the control/interaction of the user. At this time, the robot 11 may obtain intention information of the interaction due to the user's motion or voice command and perform an operation by determining a response based on the obtained intention information.

<AI+Autonomous Navigation>

By employing the AI technology, the self-driving vehicle 12 may be implemented as a mobile robot, unmanned ground vehicle, or unmanned aerial vehicle.

The self-driving vehicle 12 may include an autonomous navigation module for controlling its autonomous navigation function, where the autonomous navigation control module may correspond to a software module or a chip which implements the software module in the form of a hardware device. The autonomous navigation control module may be installed inside the self-driving vehicle 12 as a constituting element thereof or may be installed outside the self-driving vehicle 12 as a separate hardware component.

The self-driving vehicle 12 may obtain status information of the self-driving vehicle 12, detect (recognize) the surroundings and objects, generate map data, determine a travel path and navigation plan, or determine motion by using sensor information obtained from various types of sensors.

Like the robot 11, the self-driving vehicle 12 may use sensor information obtained from at least one or more sensors among lidar, radar, and camera to determine a travel path and navigation plan.

In particular, the self-driving vehicle 12 may recognize an occluded area or an area extending over a predetermined distance or objects located across the area by collecting sensor information from external devices or receive recognized information directly from the external devices.

The self-driving vehicle 12 may perform the operations above by using a learning model built on at least one or more artificial neural networks. For example, the self-driving vehicle 12 may recognize the surroundings and objects by using the learning model and determine its navigation route by using the recognized surroundings or object information. Here, the learning model may be the one trained by the self-driving vehicle 12 itself or trained by an external device such as the AI server 16.

At this time, the self-driving vehicle 12 may perform the operation by generating a result by employing the learning model directly but also perform the operation by transmitting sensor information to an external device such as the AI server 16 and receiving a result generated accordingly.

The self-driving vehicle 12 may determine a travel path and navigation plan by using at least one or more of object information detected from the map data and sensor information or object information obtained from an external device and navigate according to the determined travel path and navigation plan by controlling its driving platform.

Map data may include object identification information about various objects disposed in the space (for example, road) in which the self-driving vehicle 12 navigates. For example, the map data may include object identification information about static objects such as streetlights, rocks and buildings and movable objects such as vehicles and pedestrians. And the object identification information may include the name, type, distance, location, and so on.

Also, the self-driving vehicle 12 may perform the operation or navigate the space by controlling its driving platform based on the control/interaction of the user. At this time, the self-driving vehicle 12 may obtain intention information of the interaction due to the user's motion or voice command and perform an operation by determining a response based on the obtained intention information.

<AI+XR>

By employing the AI technology, the XR device 13 may be implemented as a Head-Mounted Display (HMD), Head-Up Display (HUD) installed at the vehicle, TV, mobile phone, smartphone, computer, wearable device, home appliance, digital signage, vehicle, robot with a fixed platform, or mobile robot.

The XR device 13 may obtain information about the surroundings or physical objects by generating position and attribute data about 3D points by analyzing 3D point cloud or image data acquired from various sensors or external devices and output objects in the form of XR objects by rendering the objects for display.

The XR device 13 may perform the operations above by using a learning model built on at least one or more artificial neural networks. For example, the XR device 13 may recognize physical objects from 3D point cloud or image data by using the learning model and provide information corresponding to the recognized physical objects. Here, the learning model may be the one trained by the XR device 13 itself or trained by an external device such as the AI server 16.

At this time, the XR device 13 may perform the operation by generating a result by employing the learning model directly but also perform the operation by transmitting sensor information to an external device such as the AI server 16 and receiving a result generated accordingly.

<AI+Robot+Autonomous Navigation>

By employing the AI and autonomous navigation technologies, the robot 11 may be implemented as a guide robot, transport robot, cleaning robot, wearable robot, entertainment robot, pet robot, or unmanned flying robot.

The robot 11 employing the AI and autonomous navigation technologies may correspond to a robot itself having an autonomous navigation function or a robot 11 interacting with the self-driving vehicle 12.

The robot 11 having the autonomous navigation function may correspond collectively to the devices which may move autonomously along a given path without control of the user or which may move by determining its path autonomously.

The robot 11 and the self-driving vehicle 12 having the autonomous navigation function may use a common sensing method to determine one or more of the travel path or navigation plan. For example, the robot 11 and the self-driving vehicle 12 having the autonomous navigation function may determine one or more of the travel path or navigation plan by using the information sensed through lidar, radar, and camera.

The robot 11 interacting with the self-driving vehicle 12, which exists separately from the self-driving vehicle 12, may be associated with the autonomous navigation function inside or outside the self-driving vehicle 12 or perform an operation associated with the user riding the self-driving vehicle 12.

At this time, the robot 11 interacting with the self-driving vehicle 12 may obtain sensor information in place of the self-driving vehicle 12 and provide the sensed information to the self-driving vehicle 12; or may control or assist the autonomous navigation function of the self-driving vehicle 12 by obtaining sensor information, generating information of the surroundings or object information, and providing the generated information to the self-driving vehicle 12.

Also, the robot 11 interacting with the self-driving vehicle 12 may control the function of the self-driving vehicle 12 by monitoring the user riding the self-driving vehicle 12 or through interaction with the user. For example, if it is determined that the driver is drowsy, the robot 11 may activate the autonomous navigation function of the self-driving vehicle 12 or assist the control of the driving platform of the self-driving vehicle 12. Here, the function of the self-driving vehicle 12 controlled by the robot 12 may include not only the autonomous navigation function but also the navigation system installed inside the self-driving vehicle 12 or the function provided by the audio system of the self-driving vehicle 12.

Also, the robot 11 interacting with the self-driving vehicle 12 may provide information to the self-driving vehicle 12 or assist functions of the self-driving vehicle 12 from the outside of the self-driving vehicle 12. For example, the robot 11 may provide traffic information including traffic sign information to the self-driving vehicle 12 like a smart traffic light or may automatically connect an electric charger to the charging port by interacting with the self-driving vehicle 12 like an automatic electric charger of the electric vehicle.

<AI+Robot+XR>

By employing the AI technology, the robot 11 may be implemented as a guide robot, transport robot, cleaning robot, wearable robot, entertainment robot, pet robot, or unmanned flying robot.

The robot 11 employing the XR technology may correspond to a robot which acts as a control/interaction target in the XR image. In this case, the robot 11 may be distinguished from the XR device 13, both of which may operate in conjunction with each other.

If the robot 11, which acts as a control/interaction target in the XR image, obtains sensor information from the sensors including a camera, the robot 11 or XR device 13 may generate an XR image based on the sensor information, and the XR device 13 may output the generated XR image. And the robot 11 may operate based on the control signal received through the XR device 13 or based on the interaction with the user.

For example, the user may check the XR image corresponding to the viewpoint of the robot 11 associated remotely through an external device such as the XR device 13, modify the navigation path of the robot 11 through interaction, control the operation or navigation of the robot 11, or check the information of nearby objects.

<AI+Autonomous Navigation+XR>

By employing the AI and XR technologies, the self-driving vehicle 12 may be implemented as a mobile robot, unmanned ground vehicle, or unmanned aerial vehicle.

The self-driving vehicle 12 employing the XR technology may correspond to a self-driving vehicle having a means for providing XR images or a self-driving vehicle which acts as a control/interaction target in the XR image. In particular, the self-driving vehicle 12 which acts as a control/interaction target in the XR image may be distinguished from the XR device 13, both of which may operate in conjunction with each other.

The self-driving vehicle 12 having a means for providing XR images may obtain sensor information from sensors including a camera and output XR images generated based on the sensor information obtained. For example, by displaying an XR image through HUD, the self-driving vehicle 12 may provide XR images corresponding to physical objects or image objects to the passenger.

At this time, if an XR object is output on the HUD, at least part of the XR object may be output so as to be overlapped with the physical object at which the passenger gazes. On the other hand, if an XR object is output on a display installed inside the self-driving vehicle 12, at least part of the XR object may be output so as to be overlapped with an image object. For example, the self-driving vehicle 12 may output XR objects corresponding to the objects such as roads, other vehicles, traffic lights, traffic signs, bicycles, pedestrians, and buildings.

If the self-driving vehicle 12, which acts as a control/interaction target in the XR image, obtains sensor information from the sensors including a camera, the self-driving vehicle 12 or XR device 13 may generate an XR image based on the sensor information, and the XR device 13 may output the generated XR image. And the self-driving vehicle 12 may operate based on the control signal received through an external device such as the XR device 13 or based on the interaction with the user.

[Extended Reality Technology]

eXtended Reality (XR) refers to all of Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology may be applied to Head-Mounted Display (HMD), Head-Up Display (HUD), mobile phone, tablet PC, laptop computer, desktop computer, TV, digital signage, and so on, where a device employing the XR technology may be called an XR device.

In what follows, an electronic device providing XR according to an embodiment of the present invention will be described.

Figure 2:
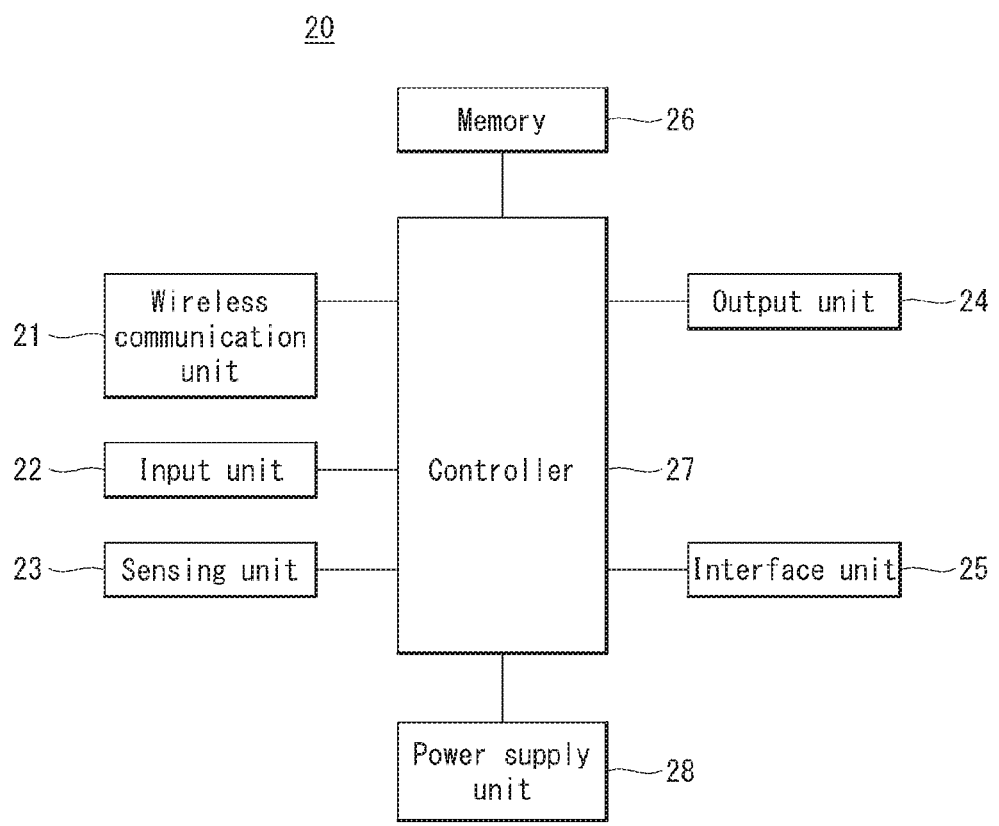
FIG. 2 is a block diagram illustrating the structure of an eXtended Reality (XR) electronic device according to one embodiment of the present invention.

FIG. 2 is a block diagram illustrating the structure of an XR electronic device 20 according to one embodiment of the present invention.

Referring to FIG. 2, the XR electronic device 20 may include a wireless communication unit 21, input unit 22, sensing unit 23, output unit 24, interface unit 25, memory 26, controller 27, and power supply unit 28. The constituting elements shown in FIG. 2 are not essential for implementing the electronic device 20, and therefore, the electronic device 20 described in this document may have more or fewer constituting elements than those listed above.

More specifically, among the constituting elements above, the wireless communication unit 21 may include one or more modules which enable wireless communication between the electronic device 20 and a wireless communication system, between the electronic device 20 and other electronic device, or between the electronic device 20 and an external server. Also, the wireless communication unit 21 may include one or more modules that connect the electronic device 20 to one or more networks.

The wireless communication unit 21 may include at least one of a broadcast receiving module, mobile communication module, wireless Internet module, short-range communication module, and location information module.

The input unit 22 may include a camera or image input unit for receiving an image signal, microphone or audio input unit for receiving an audio signal, and user input unit (for example, touch key) for receiving information from the user, and push key (for example, mechanical key). Voice data or image data collected by the input unit 22 may be analyzed and processed as a control command of the user.

The sensing unit 23 may include one or more sensors for sensing at least one of the surroundings of the electronic device 20 and user information.

For example, the sensing unit 23 may include at least one of a proximity sensor, illumination sensor, touch sensor, acceleration sensor, magnetic sensor, G-sensor, gyroscope sensor, motion sensor, RGB sensor, infrared (IR) sensor, finger scan sensor, ultrasonic sensor, optical sensor (for example, image capture means), microphone, battery gauge, environment sensor (for example, barometer, hygrometer, radiation detection sensor, heat detection sensor, and gas detection sensor), and chemical sensor (for example, electronic nose, health-care sensor, and biometric sensor). Meanwhile, the electronic device 20 disclosed in the present specification may utilize information collected from at least two or more sensors listed above.

The output unit 24 is intended to generate an output related to a visual, aural, or tactile stimulus and may include at least one of a display unit, sound output unit, haptic module, and optical output unit. The display unit may implement a touchscreen by forming a layered structure or being integrated with touch sensors. The touchscreen may not only function as a user input means for providing an input interface between the AR electronic device 20 and the user but also provide an output interface between the AR electronic device 20 and the user.

The interface unit 25 serves as a path to various types of external devices connected to the electronic device 20.

Through the interface unit 25, the electronic device 20 may receive VR or AR content from an external device and perform interaction by exchanging various input signals, sensing signals, and data.

For example, the interface unit 25 may include at least one of a wired/wireless headset port, external charging port, wired/wireless data port, memory card port, port for connecting to a device equipped with an identification module, audio Input/Output (I/O) port, video I/O port, and earphone port.

Also, the memory 26 stores data supporting various functions of the electronic device 20. The memory 26 may store a plurality of application programs (or applications) executed in the electronic device 20; and data and commands for operation of the electronic device 20. Also, at least part of the application programs may be pre-installed at the electronic device 20 from the time of factory shipment for basic functions (for example, incoming and outgoing call function and message reception and transmission function) of the electronic device 20.

The controller 27 usually controls the overall operation of the electronic device 20 in addition to the operation related to the application program. The controller 27 may process signals, data, and information input or output through the constituting elements described above.

Also, the controller 27 may provide relevant information or process a function for the user by executing an application program stored in the memory 26 and controlling at least part of the constituting elements. Furthermore, the controller 27 may combine and operate at least two or more constituting elements among those constituting elements included in the electronic device 20 to operate the application program.

Also, the controller 27 may detect the motion of the electronic device 20 or user by using a gyroscope sensor, g-sensor, or motion sensor included in the sensing unit 23. Also, the controller 27 may detect an object approaching the vicinity of the electronic device 20 or user by using a proximity sensor, illumination sensor, magnetic sensor, infrared sensor, ultrasonic sensor, or light sensor included in the sensing unit 23. Besides, the controller 27 may detect the motion of the user through sensors installed at the controller operating in conjunction with the electronic device 20.

Also, the controller 27 may perform the operation (or function) of the electronic device 20 by using an application program stored in the memory 26.

The power supply unit 28 receives external or internal power under the control of the controller 27 and supplies the power to each and every constituting element included in the electronic device 20. The power supply unit 28 includes battery, which may be provided in a built-in or replaceable form.

At least part of the constituting elements described above may operate in conjunction with each other to implement the operation, control, or control method of the electronic device according to various embodiments described below. Also, the operation, control, or control method of the electronic device may be implemented on the electronic device by executing at least one application program stored in the memory 26.

In what follows, the electronic device according to one embodiment of the present invention will be described with reference to an example where the electronic device is applied to a Head Mounted Display (HMD). However, embodiments of the electronic device according to the present invention may include a mobile phone, smartphone, laptop computer, digital broadcast terminal, Personal Digital Assistant (PDA), Portable Multimedia Player (PMP), navigation terminal, slate PC, tablet PC, ultrabook, and wearable device. Wearable devices may include smart watch and contact lens in addition to the HMD.

Figure 3:
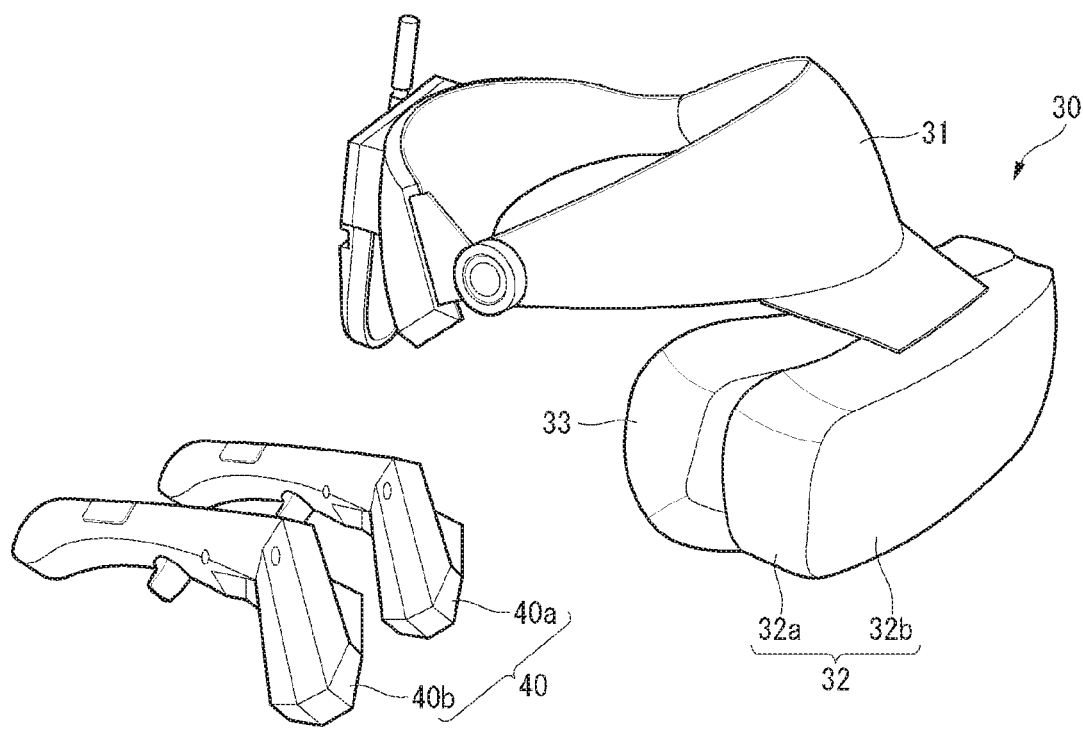
FIG. 3 is a perspective view of a VR electronic device according to one embodiment of the present invention.
Figure 4:
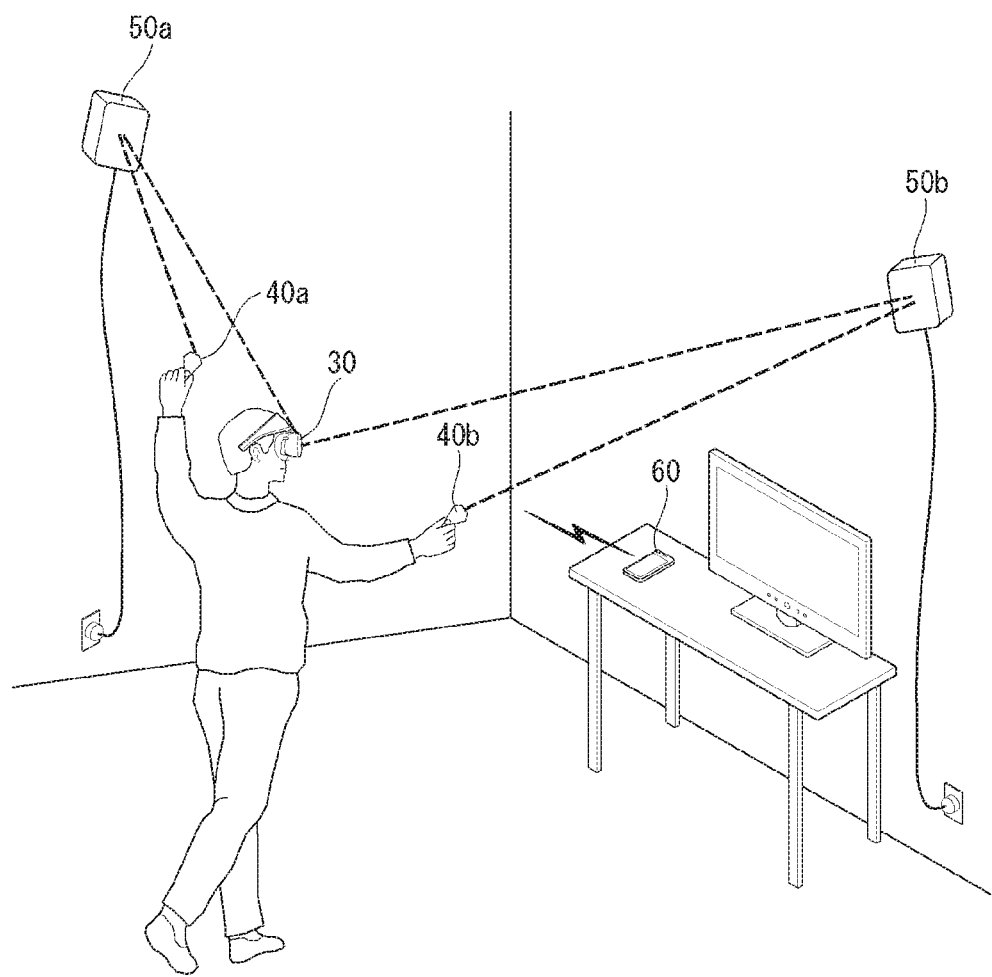
FIG. 4 illustrates a situation in which the VR electronic device of FIG. 3 is used.

FIG. 3 is a perspective view of a VR electronic device according to one embodiment of the present invention, and FIG. 4 illustrates a situation in which the VR electronic device of FIG. 3 is used.

Referring to the figures, a VR electronic device may include a box-type electronic device 30 mounted on the head of the user and a controller 40 (40a, 40b) that the user may grip and manipulate.

The electronic device 30 includes a head unit 31 worn and supported on the head and a display unit 32 being combined with the head unit 31 and displaying a virtual image or video in front of the user's eyes. Although the figure shows that the head unit 31 and display unit 32 are made as separate units and combined together, the display unit 32 may also be formed being integrated into the head unit 31.

The head unit 31 may assume a structure of enclosing the head of the user so as to disperse the weight of the display unit 32. And to accommodate different head sizes of users, the head unit 31 may provide a band of variable length.

The display unit 32 includes a cover unit 32a combined with the head unit 31 and a display unit 32b containing a display panel.

The cover unit 32a is also called a goggle frame and may have the shape of a tub as a whole. The cover unit 32a has a space formed therein, and an opening is formed at the front surface of the cover unit, the position of which corresponds to the eyeballs of the user.

The display unit 32b is installed on the front surface frame of the cover unit 32a and disposed at the position corresponding to the eyes of the user to display screen information (image or video). The screen information output on the display unit 32b includes not only VR content but also external images collected through an image capture means such as a camera.

And VR content displayed on the display unit 32b may be the content stored in the electronic device 30 itself or the content stored in an external device 60. For example, when the screen information is an image of the virtual world stored in the electronic device 30, the electronic device 30 may perform image processing and rendering to process the image of the virtual world and display image information generated from the image processing and rendering through the display unit 32b. On the other hand, in the case of a VR image stored in the external device 60, the external device 60 performs image processing and rendering and transmits image information generated from the image processing and rendering to the electronic device 30. Then the electronic device 30 may output 3D image information received from the external device 60 through the display unit 32b.

The display unit 32b may include a display panel installed at the front of the opening of the cover unit 32a, where the display panel may be an LCD or OLED panel. Similarly, the display unit 32b may be a display unit of a smartphone. In other words, the display unit 32b may have a specific structure in which a smartphone may be attached to or detached from the front of the cover unit 32a.

And an image capture means and various types of sensors may be installed at the front of the display unit 32.

The image capture means (for example, camera) is formed to capture (receive or input) the image of the front and may obtain a real world as seen by the user as an image. One image capture means may be installed at the center of the display unit 32b, or two or more of them may be installed at symmetric positions. When a plurality of image capture means are installed, a stereoscopic image may be obtained. An image combining an external image obtained from an image capture means with a virtual image may be displayed through the display unit 32b.

Various types of sensors may include a gyroscope sensor, motion sensor, or IR sensor. Various types of sensors will be described in more detail later.

At the rear of the display unit 32, a facial pad 33 may be installed. The facial pad 33 is made of cushioned material and is fit around the eyes of the user, providing comfortable fit to the face of the user. And the facial pad 33 is made of a flexible material with a shape corresponding to the front contour of the human face and may be fit to the facial shape of a different user, thereby blocking external light from entering the eyes.

In addition to the above, the electronic device 30 may be equipped with a user input unit operated to receive a control command, sound output unit, and controller. Descriptions of the aforementioned units are the same as give previously and will be omitted.

Also, a VR electronic device may be equipped with a controller 40 (40a, 40b) for controlling the operation related to VR images displayed through the box-type electronic device 30 as a peripheral device.

The controller 40 is provided in a way that the user may easily grip the controller 40 by using his or her both hands, and the outer surface of the controller 40 may have a touchpad (or trackpad) or buttons for receiving the user input.

The controller 40 may be used to control the screen output on the display unit 32b in conjunction with the electronic device 30. The controller 40 may include a grip unit that the user grips and a head unit extended from the grip unit and equipped with various sensors and a microprocessor. The grip unit may be shaped as a long vertical bar so that the user may easily grip the grip unit, and the head unit may be formed in a ring shape.

And the controller 40 may include an IR sensor, motion tracking sensor, microprocessor, and input unit. For example, IR sensor receives light emitted from a position tracking device 50 to be described later and tracks motion of the user. The motion tracking sensor may be formed as a single sensor suite integrating a 3-axis acceleration sensor, 3-axis gyroscope, and digital motion processor.

And the grip unit of the controller 40 may provide a user input unit. For example, the user input unit may include keys disposed inside the grip unit, touchpad (trackpad) equipped outside the grip unit, and trigger button.

Meanwhile, the controller 40 may perform a feedback operation corresponding to a signal received from the controller 27 of the electronic device 30. For example, the controller 40 may deliver a feedback signal to the user in the form of vibration, sound, or light.

Also, by operating the controller 40, the user may access an external environment image seen through the camera installed in the electronic device 30. In other words, even in the middle of experiencing the virtual world, the user may immediately check the surrounding environment by operating the controller 40 without taking off the electronic device 30.

Also, the VR electronic device may further include a position tracking device 50. The position tracking device 50 detects the position of the electronic device 30 or controller 40 by applying a position tracking technique, called lighthouse system, and helps tracking the 360-degree motion of the user.

The position tacking system may be implemented by installing one or more position tracking device 50 (50a, 50b) in a closed, specific space. A plurality of position tracking devices 50 may be installed at such positions that maximize the span of location-aware space, for example, at positions facing each other in the diagonal direction.

The electronic device 30 or controller 40 may receive light emitted from LED or laser emitter included in the plurality of position tracking devices 50 and determine the accurate position of the user in a closed, specific space based on a correlation between the time and position at which the corresponding light is received. To this purpose, each of the position tracking devices 50 may include an IR lamp and 2-axis motor, through which a signal is exchanged with the electronic device 30 or controller 40.

Also, the electronic device 30 may perform wired/wireless communication with an external device 60 (for example, PC, smartphone, or tablet PC). The electronic device 30 may receive images of the virtual world stored in the connected external device 60 and display the received image to the user.

Meanwhile, since the controller 40 and position tracking device 50 described above are not essential elements, they may be omitted in the embodiments of the present invention. For example, an input device installed in the electronic device 30 may replace the controller 40, and position information may be determined by itself from various sensors installed in the electronic device 30.

Figure 5:
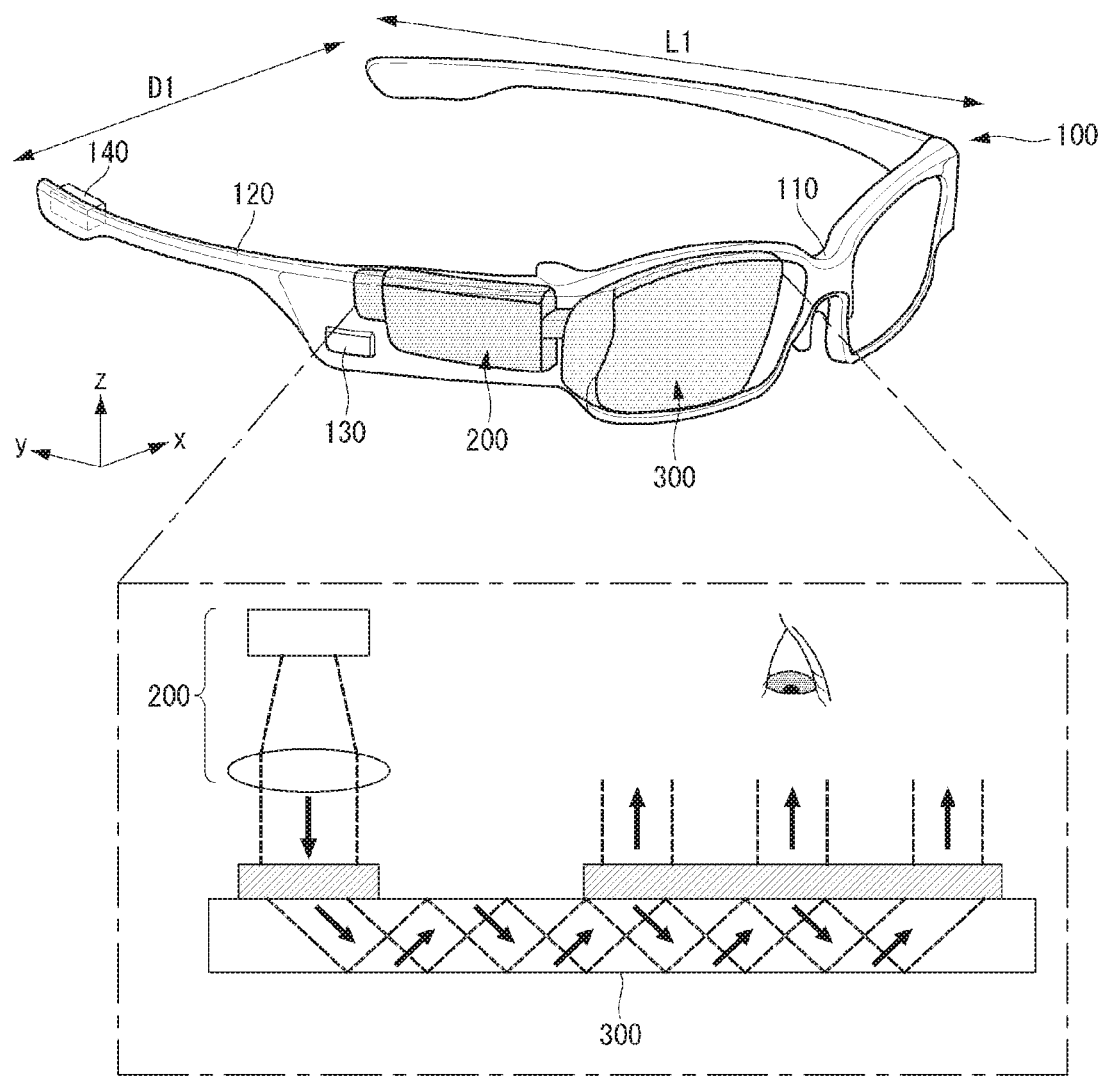
FIG. 5 is a perspective view of an AR electronic device according to one embodiment of the present invention.

FIG. 5 is a perspective view of an AR electronic device according to one embodiment of the present invention.

As shown in FIG. 5, the electronic device according to one embodiment of the present invention may include a frame 100, controller 200, and display unit 300.

The electronic device may be provided in the form of smart glasses. The glass-type electronic device may be shaped to be worn on the head of the user, for which the frame (case or housing) 100 may be used. The frame 100 may be made of a flexible material so that the user may wear the glass-type electronic device comfortably.

The frame 100 is supported on the head and provides a space in which various components are installed. As shown in the figure, electronic components such as the controller 200, user input unit 130, or sound output unit 140 may be installed in the frame 100. Also, lens that covers at least one of the left and right eyes may be installed in the frame 100 in a detachable manner.

As shown in the figure, the frame 100 may have a shape of glasses worn on the face of the user; however, the present invention is not limited to the specific shape and may have a shape such as goggles worn in close contact with the user's face.

The frame 100 may include a front frame 110 having at least one opening and one pair of side frames 120 parallel to each other and being extended in a first direction (y), which are intersected by the front frame 110.

The controller 200 is configured to control various electronic components installed in the electronic device.

The controller 200 may generate an image shown to the user or video comprising successive images. The controller 200 may include an image source panel that generates an image and a plurality of lenses that diffuse and converge light generated from the image source panel.

The controller 200 may be fixed to either of the two side frames 120. For example, the controller 200 may be fixed in the inner or outer surface of one side frame 120 or embedded inside one of side frames 120. Or the controller 200 may be fixed to the front frame 110 or provided separately from the electronic device.

The display unit 300 may be implemented in the form of a Head Mounted Display (HMD). HMD refers to a particular type of display device worn on the head and showing an image directly in front of eyes of the user. The display unit 300 may be disposed to correspond to at least one of left and right eyes so that images may be shown directly in front of the eye(s) of the user when the user wears the electronic device. The present figure illustrates a case where the display unit 300 is disposed at the position corresponding to the right eye of the user so that images may be shown before the right eye of the user.

The display unit 300 may be used so that an image generated by the controller 200 is shown to the user while the user visually recognizes the external environment. For example, the display unit 300 may project an image on the display area by using a prism.

And the display unit 300 may be formed to be transparent so that a projected image and a normal view (the visible part of the world as seen through the eyes of the user) in the front are shown at the same time. For example, the display unit 300 may be translucent and made of optical elements including glass.

And the display unit 300 may be fixed by being inserted into the opening included in the front frame 110 or may be fixed on the front surface 110 by being positioned on the rear surface of the opening (namely between the opening and the user's eye). Although the figure illustrates one example where the display unit 300 is fixed on the front surface 110 by being positioned on the rear surface of the rear surface, the display unit 300 may be disposed and fixed at various positions of the frame 100.

As shown in FIG. 5, the electronic device may operate so that if the controller 200 projects light about an image onto one side of the display unit 300, the light is emitted to the other side of the display unit, and the image generated by the controller 200 is shown to the user.

Accordingly, the user may see the image generated by the controller 200 while seeing the external environment simultaneously through the opening of the frame 100. In other words, the image output through the display unit 300 may be seen by being overlapped with a normal view. By using the display characteristic described above, the electronic device may provide an AR experience which shows a virtual image overlapped with a real image or background as a single, interwoven image.

Hereinafter, an electronic device 500 which may provide an extended reality according to an embodiment of the present invention will be described with reference to FIG. 6 and subsequent figures.

Figure 6:
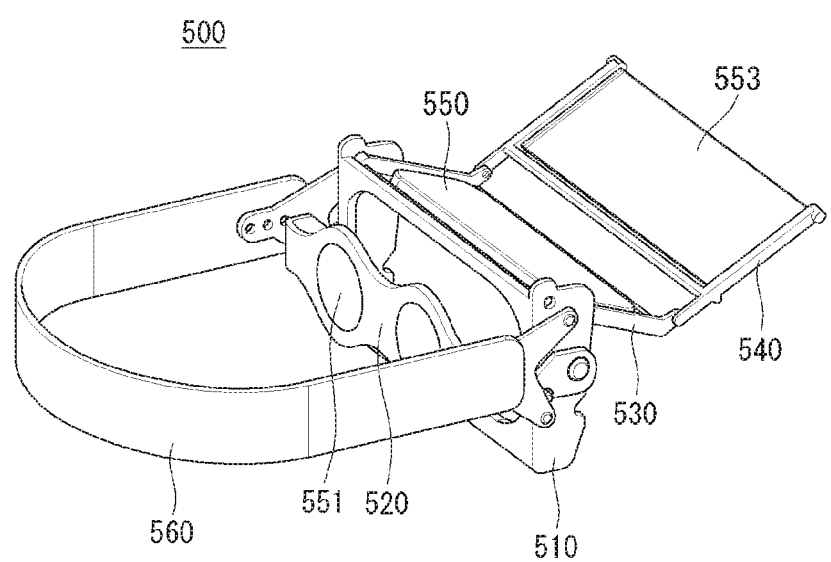
FIG. 6 is a perspective view illustrating a state of an electronic device according to an embodiment of the present invention.
Figure 7:
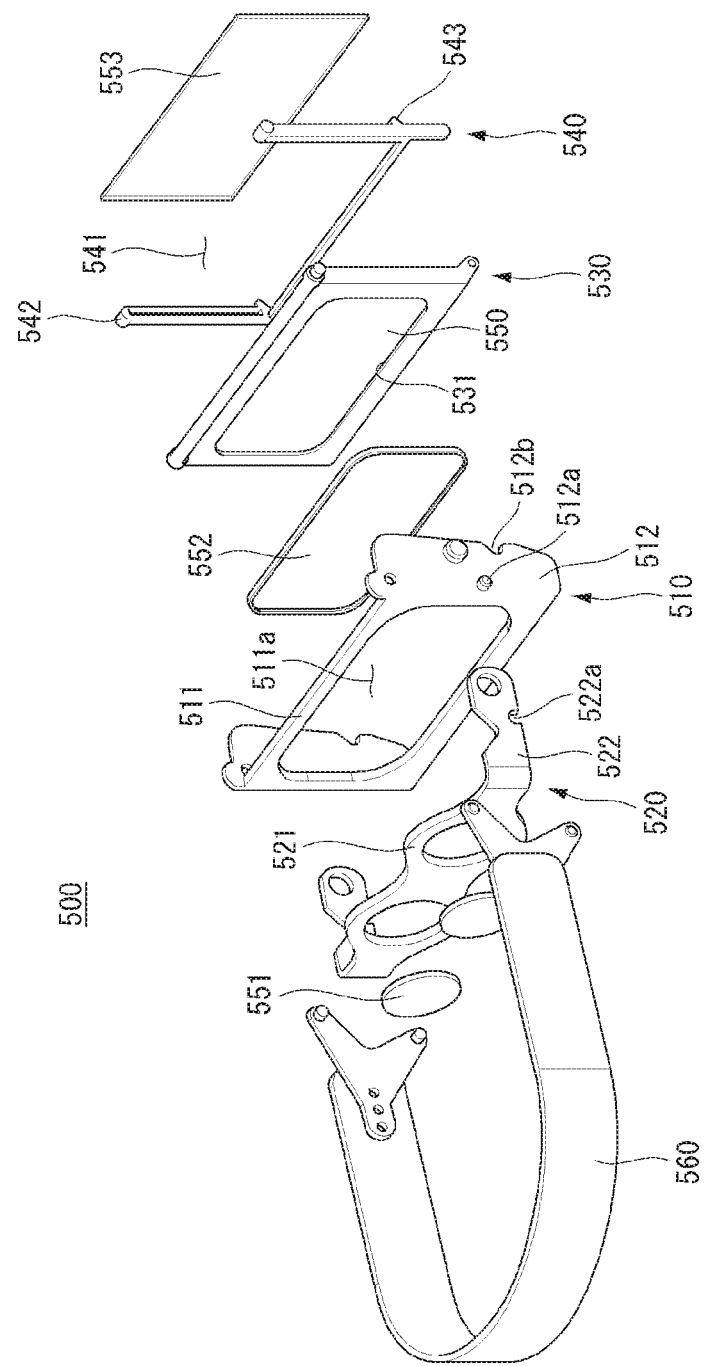
FIG. 7 is an exploded perspective view for describing a structure of the electronic device of FIG. 6.

FIG. 6 is a perspective view illustrating a state of an electronic device according to an embodiment of the present invention and FIG. 7 is an exploded perspective view for describing a structure of the electronic device of FIG. 6.

Referring to the figures, the electronic device 500 according to an embodiment of the present invention may include a virtual reality frame 520 at one side and an augmented reality frame 530 at the other side based on a main frame 510.

The main frame 510 forms a reference frame of the electronic device 500 and may be provided, for example, as a rectangular frame. Coupling portions to which the virtual reality frame 520 and the augmented reality frame 530 are coupled are provided at both side portions of the main frame 510 and a rectangular opening 511a is formed at an inner side, which corresponds to a shape of a display unit 550 to be described below.

In addition, the main frame 510 may include a front frame 511 and a pair of side frames 512 which extend to a rear (a direction in which the electronic device 500 is away from eyes of the user when the electronic device 500 is mounted) from both side portions.

An opening 511a may be formed in the front frame 511, both side frames 512 may extend to the rear from a side edge of the front frame 511, and the augmented reality frame 530 is accommodated at the inner side of the both side frames 512 to protect the accommodated augmented reality frame 530 from an external shock.

In addition, an augmented reality lens 552 may be coupled to the opening 511a of the main frame 510. The user may simultaneously recognize an external reality image and a virtual image of the display unit 550 through the opening 511a and in this case, since focal distances of the reality image and the virtual image are different from each other, sharpness of the virtual image may deteriorate and may be heterogeneously recognized. However, when the focal distance of the virtual image is changed through the augmented reality lens 552, the user may clearly see the augmented reality image in which the reality image is mixed with the virtual image.

On the other hand, the augmented reality lens 552 may be provided in the main frame 510 or may be provided in the augmented reality frame 530 to be described below. A distance between the augmented reality lens 552 and the display unit 550 in the AR mode is changed according to the arrangement of the augmented reality lens 552. Accordingly, the focal distance of the lens, etc., may vary according to the arrangement of the augmented reality lens 552.

The virtual reality frame 520 may be rotatably coupled to the front side of the main frame 510. For example, in the augmented reality frame 530, two openings 521 to which two virtual reality lenses 551 corresponding to left and right eyes of the user are coupled are formed spaced apart from each other horizontally and the augmented reality frame 530 may be provided in a glasses frame or goggles shape.

The virtual reality frame 520 may include a front frame 521 on which the virtual reality lens 551 is mounted and disposed adjacent to the eye of the user when the virtual reality lens 551 is mounted and a pair of side frame 552 which extend to the rear (a direction in which the electronic device 500 is away from the eye of the user when the electronic device 500 is mounted) from both side portions. The opening 521a may be formed in the front frame 521, both side frames 522 may extend to the rear from the side edge of the front frame 521, and the both side frames 522 may be rotatably coupled to the side frame 521 of the main frame 510 so that the distance between the display unit 550 and the virtual reality lens 551 becomes a set distance.

In addition, when the virtual reality frame 520 rotates upward, the location of a rotating part and a length of the side frame 522 may be determined so that an upper portion of the main frame 510 and the front frame 521 do not interfere with each other. For example, when the user intends to use virtual reality contents, the virtual reality frame 520 rotates downward so that the virtual reality lens 551 and the opening 511a of the main frame 510 are arranged side by side and when the user intends to use augmented reality contents, the virtual reality frame 520 rotates upward, and as a result, the front frame 521 is positioned above the main frame 510 so as to prevent a vision of the user from being obscured. Referring to the drawings, the side frame 522 of the virtual reality frame 520 may be coupled to a middle portion in a height direction of the side frame 512 of the main frame 510.

In addition, a support groove 522a may be formed on the side frame 522 of the virtual reality frame 520, which may be supported on the side frame 512 of the main frame 510. For example, a support protrusion 512a may be formed, which protrudes laterally outward from the side frame 512 of the main frame 510 and a support groove 522a may be formed, which is recessed upward from a lower side of the side frame 522 of the virtual reality frame 520. When the virtual reality frame 520 rotates downward so that the virtual reality lens 551 is disposed in parallel with the opening 511a of the main frame 510, the support protrusion 512a of the main frame 510 may be fit in the support groove 522a of the virtual reality frame 520 and the virtual reality frame 520 may be fixed while being supported on the main frame 510.

The augmented reality frame 530 may be rotatably coupled to the rear side of the main frame 510. In addition, the augmented reality frame 530 may be equipped with the display unit 550 providing virtual reality or augmented reality contents. The display unit 550 may be provided in a shape corresponding to the shape of the opening 511a of the main frame 510 and may provide a content image (or video) to the user through the opening 511a of the main frame 510.

The display unit 550 is provided to display the virtual reality or augmented reality contents and may be mounted inside the augmented reality frame 530. For example, the augmented reality frame 530 is provided in a slim box shape that accommodates the display unit 550 therein and include an opening 531 through which the display unit 550 is exposed to the outside, which is formed on the front surface facing the main frame 510.

In addition, the augmented reality frame 530 may include a control unit (not illustrated) that provides contents to the display unit 550 therein or a communication unit (not illustrated) that connects an external control unit and the display unit 550 by wire or wirelessly. For example, the augmented reality frame 530 may be provided with a wireless receiving unit (not illustrated) capable of receiving contents provided by a smartphone therein and the display unit 550 may convert image data input through the wireless receiving unit and display the converted image data on the screen.

The augmented reality frame 530 may be provided in a size and a shape to be accommodated inside the side frame 512 of the main frame 510 and may be rotatably coupled to the upper portion of the main frame 510. As an example, the augmented reality frame 530 may be rotatably coupled to an upper side of the main frame 510 through a hinge structure. Specifically, the augmented reality frame 530 may be rotatably coupled through the hinge structure provided on the upper portion of the side frame 512 of the main frame 510.

Specifically, when the augmented reality frame 530 rotates downward, the display unit 550 is disposed adjacent to the opening 511a of the main frame 510 so that the user may directly see the image of the display unit 550 through the opening 511a and when the augmented reality frame 530 rotates upward, the display unit 550 moves away from the opening 511a of the main frame 510 so that the user may see an external environment in the rear of the main frame 510 through the opening 511a.

In this case, the image of the display unit 550 is reflected by a reflection member 553 to be described below and transferred to the eyes of the user through the opening 511a and the user may see the image of the display unit 550 reflected by the reflection member 553 mixed with the external environment seen through the opening 511a.

Further, the electronic device 500 may further include the reflection member 553 reflecting the image of the display unit 550 and transferring the reflected image to the eyes of the user and a reflection fame 540 on which the reflection member 553 is mounted.

The reflection member 553 may be provided as a half mirror. Accordingly, by passing rear light, the reflection member 553 reflects the image of the display unit 550 without hiding a rear reality image, and as a result, the virtual image and the reality image may be mixed and seen by the eyes of the user.

The reflective frame 540 may be rotatably coupled to one side of the augmented reality frame 530 and the reflection member 553 may reflect the image of the display unit 550 and transfer the reflected image to the opening 511a of the main frame 510 when forming a predetermined angle with the display unit 550.

Specifically, one side of the augmented reality frame 530 is rotatably coupled to the upper portion of the main frame 510 and the other side of the augmented reality frame 530 is rotatably coupled to the reflection frame 540.

The reflection frame 540 may be provided with at least three frames that may fix the reflection member 553 to the inside and the reflection member 540 may include an opening 541 which rotates in one direction and exposes the reflection member 530 to the outside, which is formed on the front surface which may face the main frame 510 in an inclined state.

In addition, the hinge structure may be provided at one side, in which the reflection frame 540 is rotatably coupled to the augmented reality frame 530 and a support protrusion 542 may be formed at the other side, which may be supported on the side frame 512 of the main frame 510. For example, a support groove 512b may be formed, which is recessed inward from the rear side of the side frame 512 of the main frame 510 and a support protrusion 542 may be formed, which protrudes laterally from the other end of the reflection frame 540. When the reflection frame 540 rotates so that the other side is close to the main frame 510, the support protrusion 542 of the reflection frame 540 fits into the support groove 512b of the side frame 512 and the reflection frame 540 may be fixed while being supported on the main frame 510.

In addition, a stopper 543 may be formed near the hinge structure of the reflection frame 540 to limit a coupling angle with the augmented reality frame 530. The stopper 543 may protrude in a direction to face the inside of the reflection frame 540, i.e., the main frame 510. The stopper 542 is provided to interfere with the augmented reality frame 530 when the reflection frame 540 rotates inward at a predetermined angle. As an example, when the reflection fame 540 rotates inward and forms 45 degrees with the augmented reality frame 530, the stopper 542 may be provided to interfere with the augmented reality frame 530.

In addition, the stopper 542 does not interfere with the augmented reality frame 530 in a direction in which the reflection frame 540 is away from an outer side, i.e., the main frame 510. Accordingly, the reflection frame 540 may freely rotate outward and may be disposed in parallel with the augmented reality frame 530 while being folded outward of the augmented reality frame 530. When the user uses a virtual reality mode (the reflection member is not required), the reflection frame 540 is folded outward to be close to 180 degrees while being folded on the same plane as the augmented reality frame 530 to minimize a volume.

In addition, since the reflection member 553 is disposed to be inclined with the opening 511a of the main frame 510, the focal distances up to the upper portion and the lower portion of the reflection member 553 from the user may be changed. Specifically, the distance up to the upper portion of the reflection member 553 from the eyes of the user may be longer than the distance up to the lower portion. In this case, it is necessary to correct the image as the focal length varies. The correction of the image may be performed by a control unit (not illustrated) that provides the image to the display unit 550 or performed through the augmented reality lens 552 mounted on the display unit 550 or the opening 511a of the main frame 510. Alternatively, image correction according to distance may be performed through both the control unit (not illustrated) and the augmented reality lens 552.

In addition, the electronic device 500 may further include a support band 560 for fixing the main frame 510 to a head part or a face of the user. For example, the support band 560 may be a band that has both ends fixed to both side frames 512 of the main frame 510 and surrounds the head part of the user. Although a coupling structure of the support band 560 is illustrated in the drawing, a different structure therefrom may be employed, of course.

In addition, the support band 560 may be made of an elastic material to provide a comfortable wearing sense to the user and the electronic device 500 may be firmly supported even when a head circumference of the user is different.

Further, the electronic device 500 may further include a face support pad for fixing the main frame 510 to the face of the user. For example, the face support pad may be coupled to the inner side of the front frame 511 of the main frame 510 and may be made of a material having an excellent wearing sense when being supported on the face around the eyes of the user. In addition, the face support pad is provided to be deformed to provide convenience even when a facial shape of the user is changed.

Next, a method for switching the virtual reality mode and the augmented reality mode will be described with reference to FIGS. 8 to 11.

Figure 8:
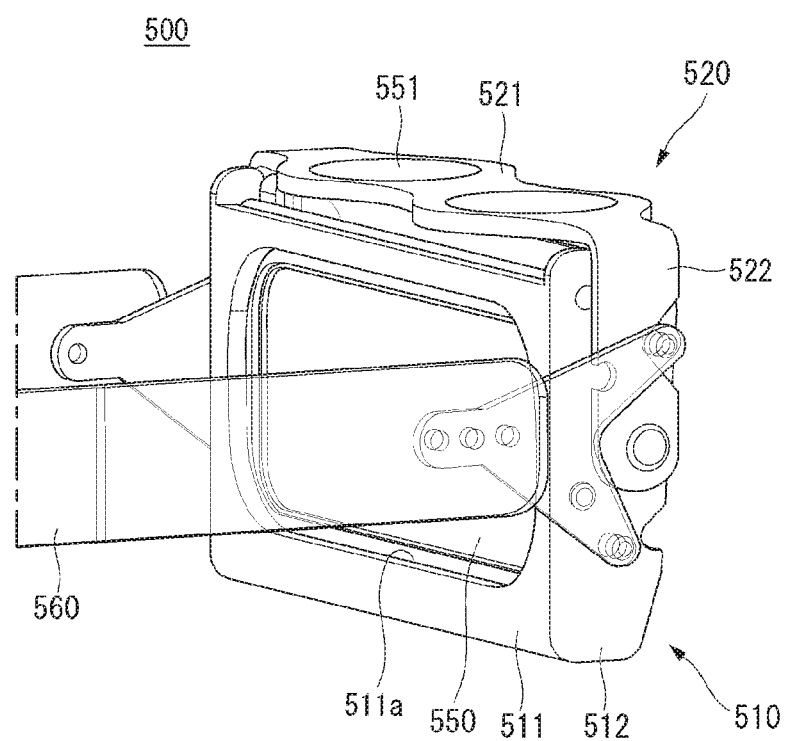
FIG. 8 is a diagram illustrating a state for storing the electronic device of FIG. 6.
Figure 9:
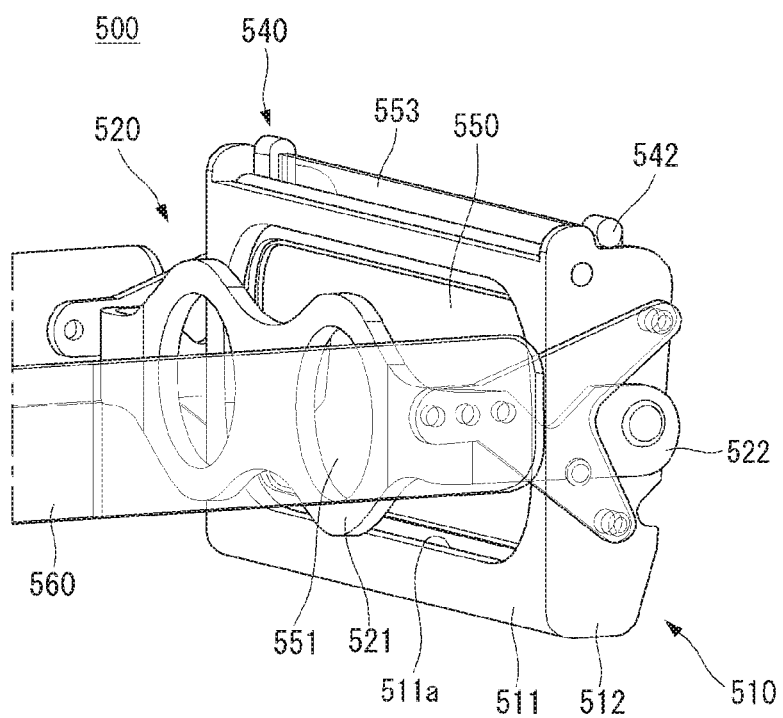
FIG. 9 is a diagram illustrating a state when the electronic device of FIG. 6 operates in a virtual reality mode.
Figure 10A:
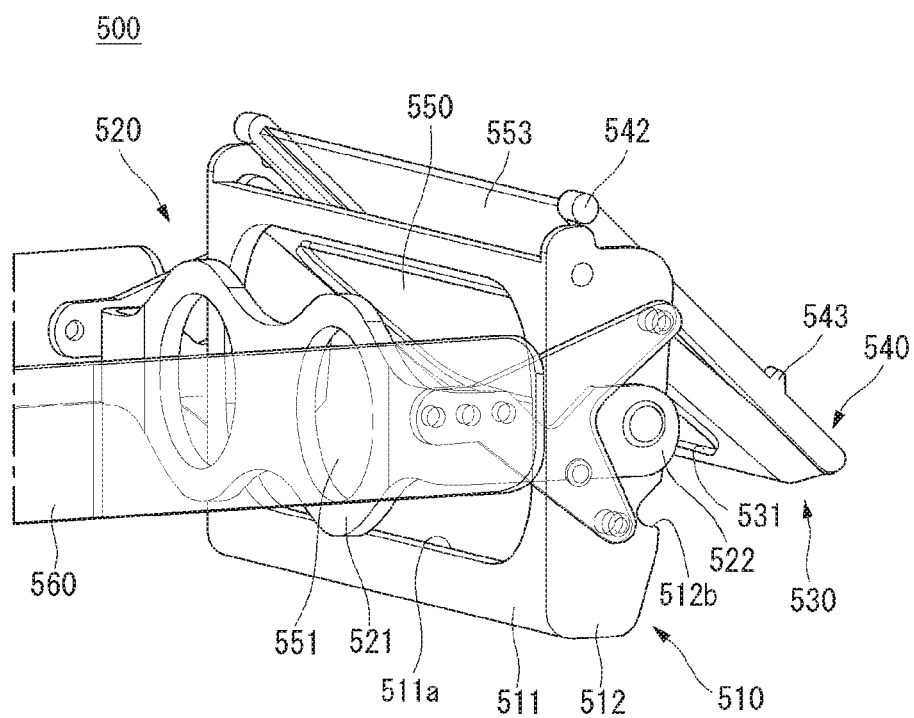
FIG. 10 is a diagram illustrating a state for an intermediate process of changing a mode of the electronic device of FIG. 6.
Figure 10B:
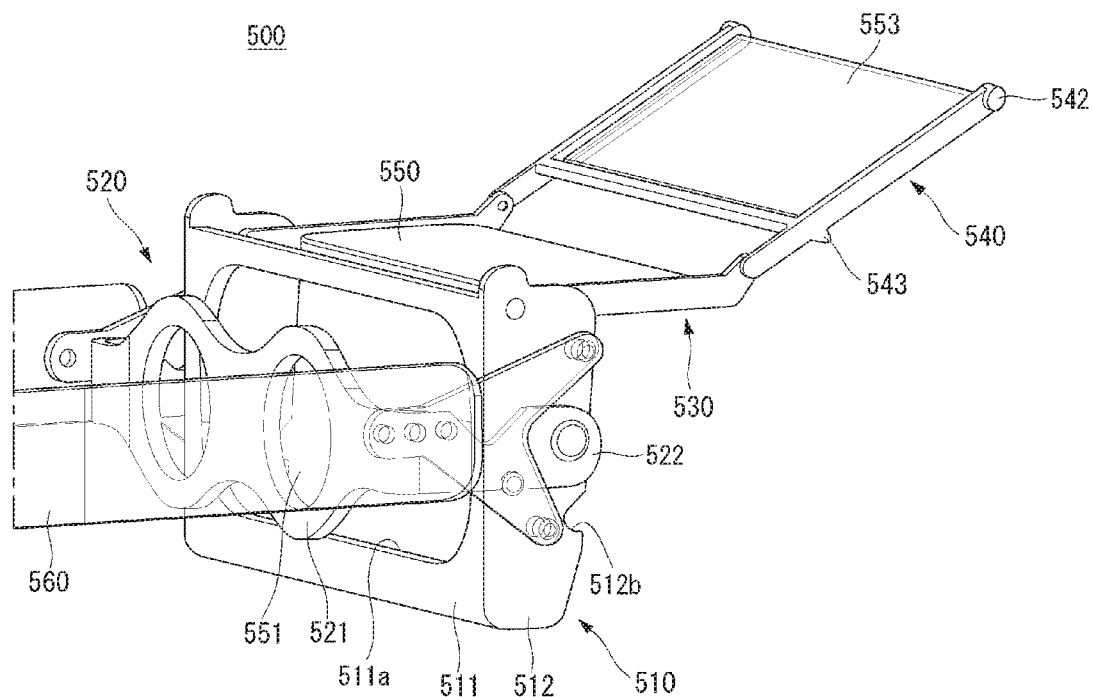
Figure 10C:
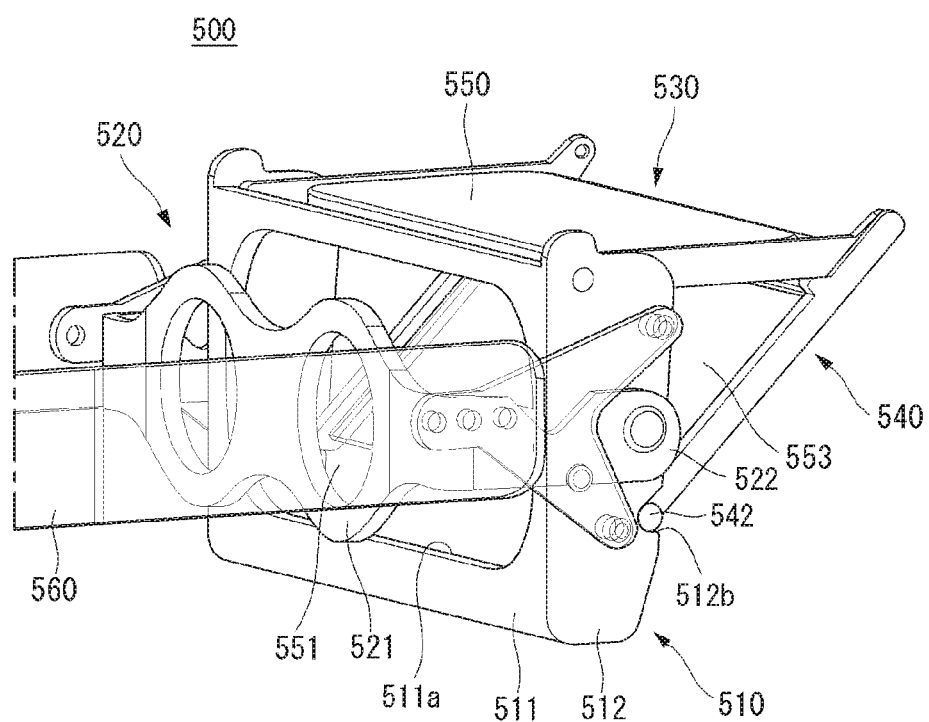
Figure 11:
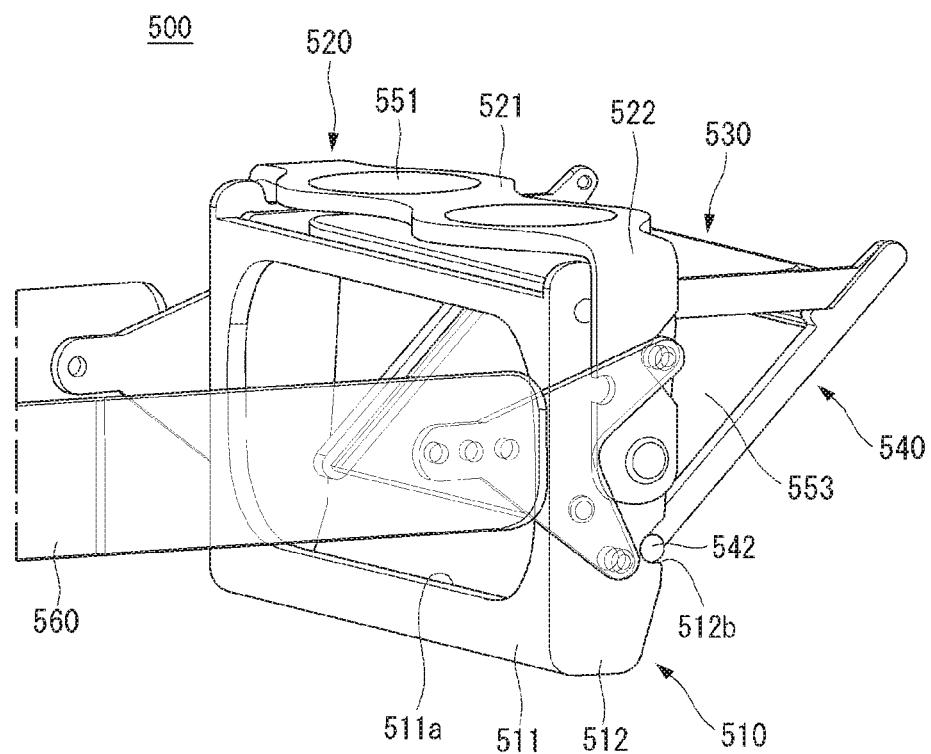
FIG. 11 is a diagram illustrating a state when the electronic device of FIG. 6 operates in an augmented reality mode.

FIG. 8 is a diagram illustrating a state for storing the electronic device of FIG. 6, FIG. 9 is a diagram illustrating a state when the electronic device of FIG. 6 operates in a virtual reality mode, FIG. 10 is a diagram illustrating a state for an intermediate process of changing a mode of the electronic device of FIG. 6, and FIG. 11 is a diagram illustrating a state when the electronic device of FIG. 6 operates in an augmented reality mode.

Referring to FIG. 8, when storing the electronic device 500 according to an embodiment of the present invention, the virtual reality frame 520 may be rotated upward to minimize the volume, and the reflection frame 540 may be rotated to be in close contact with the augmented reality frame 530, and the augmented reality frame 530 may be rotated downward to be in close contact with the main frame 510.

Referring to FIG. 9, in order to use the virtual reality mode in FIG. 8, the support groove 522a formed in the side frame 522 of the virtual frame 520 is coupled to be supported on the support protrusion 512a formed on the side frame 512 of the main frame 510 by rotating the virtual reality frame 520 downward. As a result, the virtual reality lens 551 is parallel to the opening 511a of the main frame 510 so that the user may see the virtual image of the display unit 550 through the virtual reality lens 551. In this case, the augmented reality frame 530 may be maintained to be rotated downward to be in close contact with the main frame 510 and the display unit 550 may be accommodated in close contact with the inner side of the opening 511a of the main frame 510.

Referring to FIG. 10(a), in order to use the augmented reality mode in FIG. 9, a lower part of the augmented reality frame 530 is rotated to be spaced apart from a rear surface of the main frame 510. In this case, the augmented reality frame 530 is hinge-coupled to the upper portion of the main frame 510 to rotate and move.

In addition, referring to FIG. 10(b), an upper part of the reflection frame 540 is rotated at 180 degrees or more from the rear surface of the augmented reality frame 530 while the augmented reality frame 530 is rotated upward at approximately 90 degrees to be spaced apart from the augmented reality frame 530. In this case, the reflection frame 540 is hinge-coupled to the lower portion of the augmented reality frame 530 to rotate and move.

In addition, referring to FIG. 10(c), when the reflection frame 540 rotates at approximately 315 degrees with respect to the rear surface of the augmented reality frame 530, the support protrusion 542 of the reflection frame 540 may be coupled to be inserted into the support groove 512b formed in the side frame 512 of the main frame 510. In this state, the reflection frame 540 is coupled to both the front surface of the augmented reality frame 530 and the rear surface of the main frame 510 while forming an angle of approximately 45 degrees.

Last, referring to FIG. 11, the virtual reality frame 520 is rotated upward and moved to the upper portion of the main frame 510 as illustrated in FIG. 8 so as to prevent the virtual reality frame 520 to cover the opening 511a of the main frame 510. In this state, the user may see the image of the display unit 550, which is reflected by the reflection member 553 simultaneously with the external environment through the opening 511a of the main frame 510. In this case, the reflection member 553 is made of a translucent material to transmit the external image to the user as described above.

Figure 12:
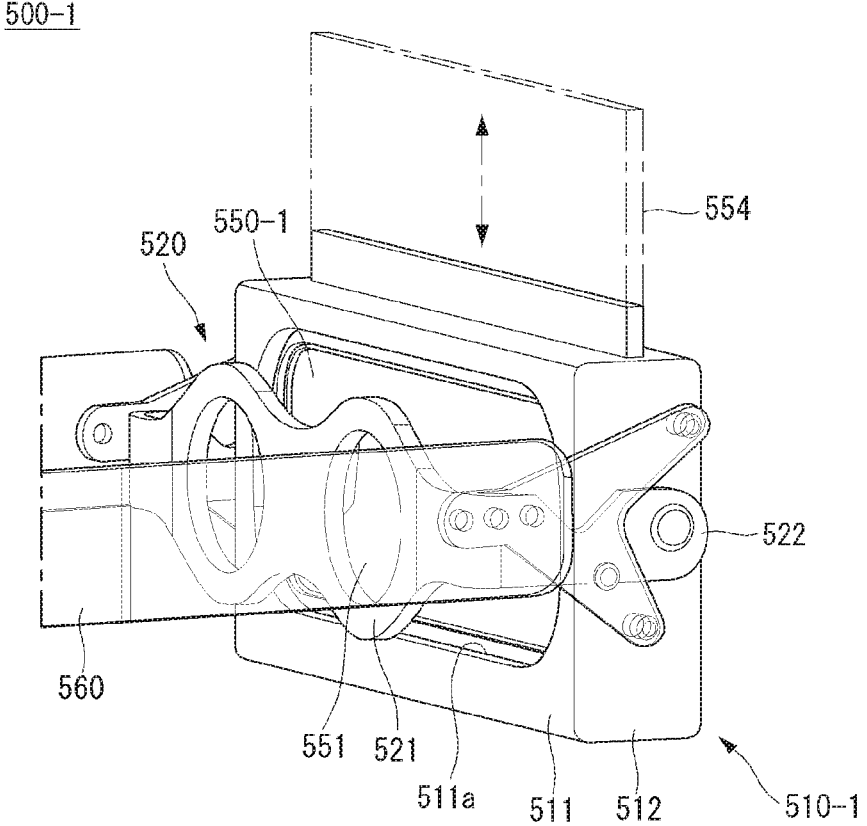
FIG. 12 is a perspective view of an electronic device according to another embodiment of the present invention.

FIG. 12 is a perspective view of an electronic device 500-1 according to another embodiment of the present invention.

Referring to FIG. 12, in the electronic device 500-1 according to another embodiment of the present invention, a display unit 550-1 is made of the translucent material. Here, the term "translucent" means a state in which that the display unit 550-1 passes through the light so that the user may see the virtual image displayed in the display unit 550-1 while viewing the outside through the display unit 550-1.

Specifically, in the electronic device 500-1 according to another embodiment of the present invention, the augmented reality frame may be integrally provided in a main frame 510-1. That is, the main frame 510-1 has the display unit 550-1 therein and the display unit 550-1 is not separated or away from the main frame 510-1 when used in the augmented reality mode.

However, in this case, since the display unit 550-1 is provided to be translucent when used in the virtual reality mode, there is a problem in that an external reality image is viewed behind the virtual reality image.

In order to solve such a problem, a blocking member 554 may be detachably coupled to the rear of the main frame 510-1. The blocking member 554 is made of a material that does not transmit light, and when the blocking member 554 is disposed in the rear of the main frame 510-1, the reality image may be prevented from being exposed to the user through the translucent display unit 550-1.

The blocking member 554 is partially coupled to the main frame 510-1 to be movably provided or detachably provided.

As an example, the blocking member 554 may be provided to slide along a guide groove formed in a vertical direction inside the side frame 512 of the main frame 510-1. In this case, the lower portion of the guide groove is blocked to prevent the blocking member 554 from falling down the main frame 510. In addition, the blocking member 554 may be provided to be separated from the guide groove and the rear of the display unit 550-1 is opened by adopting a structure in which the stopper which protrudes to the lower end of the blocking member 554 is suspended on an upper end of the guide groove and the blocking member 554 may not be completely separated from the main frame 510-1.

In the virtual reality mode, the blocking member 554 is disposed in the rear of the display unit 550-1 to block external light. In the virtual reality mode, the user may see only the virtual image by blocking the external image by the blocking member 554.

In addition, in the augmented reality mode, the blocking member 554 opens the rear of the display unit 550-1 to allow the external light to reach the eyes of the user through the opening 511a. The user may see both the reality image and the virtual image through the translucent display unit 550-1 in the augmented reality mode.

Figure 13:
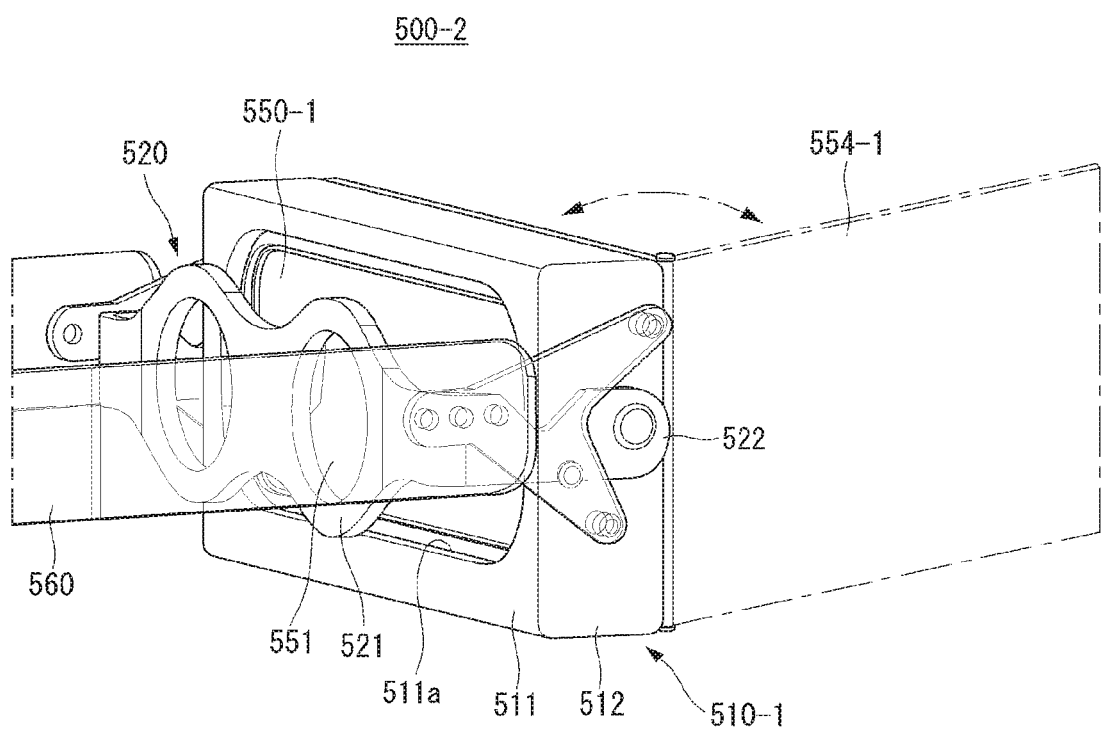
FIGS. 13 and 14 are perspective views illustrating a modified example of FIG. 12.
Figure 14:
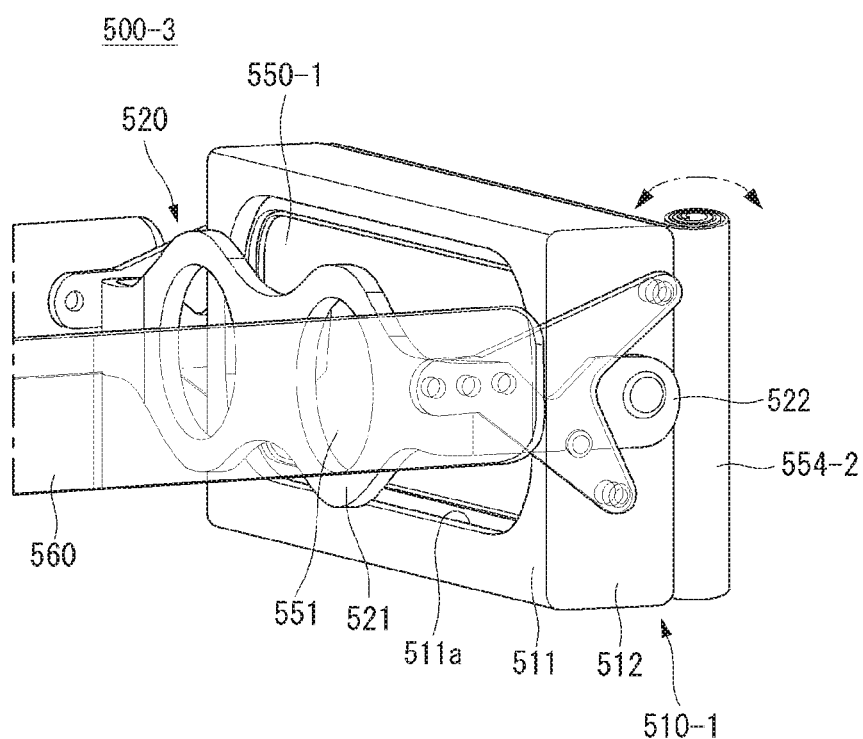

FIGS. 13 and 14 are perspective views illustrating modified examples 554-1 and 554-2 of the blocking member 554 of FIG. 12.

Referring to FIG. 13, a blocking member 554-1 may be hinge-coupled to one side of the side frame 512 of the main frame 510-1.

In the virtual reality mode, the blocking member 554-1 is provided in a closed state to cover the rear of the display unit 550-1. In addition, in the augmented reality mode, the blocking member 554-1 rotates to one side of the main frame 510-1 around a hinge shaft and switches to an opened state so as to open the rear of the display unit 550-1.

Referring to FIG. 14, a blocking member 554-2 may be stored at the side or one upper/lower side of the main frame in a roll state.

Specifically, the blocking member 554-2 may be made of a flexible material and stored at one side of an edge of the main frame 510-1 in the roll state. In addition, a shape memory elastic member in the roll estate may be provided in the rear or at one side of the edge of the blocking member 554-2. Therefore, in the absence of external force, the blocking member 554-2 may be maintained in the roll state by elastic force of the elastic member. In addition, a fixation ring to which the blocking member 554-2 may be fixed while being unfolded may be provided at the other side of one side of the edge where the blocking member 554-2 is stored.

In the virtual reality mode, the user unfolds the blocking member 554-2 to fix the blocking member 554-2 to the fixation ring at the other side of the main frame 510-1. In addition, in the augmented reality mode, the blocking member 554-2 is released from the fixation ring, etc., and the blocking member 554-2 is automatically rolled in the roll state by the elastic force of the elastic member.

Particular embodiments or other embodiments of the present invention described above are not mutually exclusive to each other or distinguishable from each other. Individual structures or functions of particular embodiments or other embodiments of the present invention described above may be used in parallel therewith or in combination thereof.

For example, it means that structure A described with reference to a specific embodiment and/or figure and structure B described with reference to other embodiment and/or figure may be combined together. In other words, even if a combination of two different structures is not explicitly indicated, it should be understood that combination thereof is possible unless otherwise stated as impossible.

The detailed descriptions above should be regarded as being illustrative rather than restrictive in every aspect. The technical scope of the present invention should be determined by a reasonable interpretation of the appended claims, and all of the modifications that fall within an equivalent scope of the present invention belong to the technical scope of the present invention.

EXPLANATION OF REFERENCE NUMERALS AND SYMBOLS

30: Virtual reality electronic device
31: Head unit
32: Display unit
32a: Cover unit
32b: Display unit
33: Face pad
40: Controller
50: Location tracking device
60: External device
100: Augmented reality electronic device
110, 120: Frame unit
130: User input unit
140: Sound output unit
200: Control unit
300: Display unit
500: Electronic device
510: Main frame
511: Front frame
511a: Opening
512: Side frame
512a: Support protrusion
512b: Support groove
520: Virtual reality frame
521: Front frame
521a: Opening
522: Side frame
522a: Support groove
530: Augmented reality frame
531: Opening
540: Reflection frame
541: Opening
542: Support protrusion
543: Stopper
550: Display unit
551: Virtual reality lens
552: Augmented reality lens
553: Reflection member
554: Blocking member
560: Support band

What is claimed is:

1. An electronic device comprising:
a main frame having a first opening;
a display unit connected to the main frame and having a display area which may be exposed through the first opening; and
a virtual reality frame movably coupled to the main frame and having a second opening to which a first lens is coupled, wherein when the virtual reality frame moves to a first location where the first opening and the second opening are arranged side by side in a sight direction of a user, the user is capable of recognizing an image of the display unit as a virtual reality image through the first lens, and wherein when the virtual reality frame moves to a second location deviated from the first location, the user is capable of recognizing the image of the display unit as an augmented reality image.

2. The electronic device of claim 1, wherein the virtual reality frame is rotatably coupled to the main frame to move between the first location and the second location.

3. The electronic device of claim 2, wherein the main frame includes a first stop member, and wherein the virtual reality frame rotates downward and moves to the first location and is supported on the first stop member at the first location and rotates upward and moves to the second location.

4. The electronic device of claim 1, wherein the display unit includes a second lens for converting the image into an augmented reality image.

5. The electronic device of claim 1, wherein the display unit is movable to a third location where the display area is disposed inside the first opening and a fourth location in which the display area is far from the first opening.

6. The electronic device of claim 5, further comprising:
a reflection member reflecting the image of the display unit at the fourth location and transferring the reflected image to eyes of the user through the first opening.

7. The electronic device of claim 6, wherein the main frame includes a second stop member, and wherein the reflection member is rotatably coupled to the display unit, and rotates and moves to be supported on the second stop member.

8. The electronic device of claim 7, wherein one side of the display unit is rotatably coupled to the main frame and the other side is rotatably coupled to one side of the reflection member, and wherein the other side of the reflection member is supportable on the second stop member.

9. The electronic device of claim 8, wherein while the reflection member is supported on the second stop member, the display unit and the reflection member form an angle of 45 degrees and the reflection member and the first opening form the angle of 45 degrees.

10. The electronic device of claim 6, wherein the reflection member is provided to reflect the image of the display unit and transmit external light.

11. The electronic device of claim 1, wherein the display unit is provided to transmit the external light, and wherein the user is capable of simultaneously recognizing the image of the display unit and an environment reflected through the display unit, through the first opening.

12. The electronic device of claim 11, further comprising:
a blocking member provided at one side of the display unit and made of a translucent or opaque material, wherein the blocking member is provided to move between a location to open an area corresponding to the display area of the display unit and a location to block the area.

13. The electronic device of claim 12, wherein the blocking member is provided to slidably move at one side of the display unit.

14. An electronic device comprising:
a main frame having a first opening;
a virtual reality frame movably coupled to the main frame between a first location and a second location and having a second opening to which a first lens is coupled; and
an augmented reality frame movably coupled to the main frame between a third location and a fourth location and including a display unit, wherein when the virtual reality frame is positioned at the first location and the augmented reality frame is positioned at the third location, a user is capable of recognizing the image of the display unit as a virtual reality image through the second opening and the first opening, and wherein when the virtual reality frame is positioned at the second location and the augmented reality frame is positioned at the fourth location, the user is capable of recognizing an augmented reality image in which the image of the display unit is mixed with a reality image viewed through the first opening.

15. The electronic device of claim 14, wherein in the augmented reality image, at the third location, a display area of the display unit is disposed adjacent to the first opening to be directly exposed through the first opening, and wherein at the fourth location, the display area of the display unit is disposed away from the first opening and the image of the display unit is reflected by a reflection member and transferred to eyes of the user through the first opening.

16. The electronic device of claim 14, further comprising:
a reflection member reflecting the image of the display unit and transferring the reflected image to the eyes of the user through the first opening.

17. The electronic device of claim 16, wherein in the augmented reality image, at the third location, the display area of the display unit is disposed adjacent to the first opening to be directly exposed through the first opening, and wherein at the fourth location, the display area of the display unit is disposed away from the first opening and the image of the display unit is reflected by the reflection member and transferred to eyes of the user through the first opening.

18. The electronic device of claim 16, wherein the virtual reality frame is rotatably coupled to the main frame, wherein one side of the augmented reality frame is rotatably coupled to the main frame, and wherein the reflection member is rotatably coupled to the other side of the augmented reality frame.

19. An electronic device comprising:
a main frame having a first opening;
a virtual reality frame movably coupled to one side of the main frame; and
an augmented reality frame movably coupled to the other side of the main frame, wherein when the virtual reality frame and the augmented reality frame are positioned at a first location, a virtual reality image is provided to a user, and wherein when the virtual reality frame and the augmented reality frame are positioned at a second location, an augmented reality image is provided to the user.

* * * * *